(12) United States Patent
Zhou et al.

(10) Patent No.: US 12,003,468 B2
(45) Date of Patent: Jun. 4, 2024

(54) INFORMATION PROCESSING METHOD, APPARATUS AND MEDIUM

(71) Applicant: BEIJING BYTEDANCE NETWORK TECHNOLOGY CO., LTD., Beijing (CN)

(72) Inventors: Jingran Zhou, Beijing (CN); Na Sun, Beijing (CN); Kefei Wu, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/612,192

(22) PCT Filed: Jul. 21, 2021

(86) PCT No.: PCT/CN2021/107548
§ 371 (c)(1),
(2) Date: Nov. 17, 2021

(87) PCT Pub. No.: WO2022/077994
PCT Pub. Date: Apr. 21, 2022

(65) Prior Publication Data
US 2022/0311719 A1    Sep. 29, 2022

(30) Foreign Application Priority Data
Oct. 13, 2020   (CN) .......................... 202011092230.7

(51) Int. Cl.
*H04L 51/046* (2022.01)
*G06F 3/04817* (2022.01)
(Continued)

(52) U.S. Cl.
CPC ........ *H04L 51/046* (2013.01); *G06F 3/04817* (2013.01); *G06F 3/0482* (2013.01);
(Continued)

(58) Field of Classification Search
CPC ... H04L 51/046; H04L 51/10; G06F 3/04817; G06F 3/0482; G06F 2203/04804; G06F 3/04847; G06F 3/0485; G06T 11/00
See application file for complete search history.

(56) References Cited

U.S. PATENT DOCUMENTS

| 2014/0297786 A1 | 10/2014 | Caskey et al. |
| 2015/0256666 A1 | 9/2015 | Peterson |
| 2017/0329615 A1 | 11/2017 | Kahn |

FOREIGN PATENT DOCUMENTS

| CN | 103237127 A | | 8/2013 |
| CN | 103701993 A | * | 4/2014 |

(Continued)

OTHER PUBLICATIONS

Zhao, et al. "Research on the security protection of instant message service in rich communication service," Telecom Engineering Technology and Standardization, 2018, vol. 11, English abstract only (5 pages).

(Continued)

*Primary Examiner* — Cao H Nguyen

(57) ABSTRACT

The present disclosure relates to an information processing method, apparatus, and medium. The information processing method includes: displaying target information; when a sending operation of a user for the target information is detected, displaying a target control for triggering cancellation of sending the target information; and when a first triggering operation of the user for the target control is detected within a preset time duration, canceling sending the target information.

16 Claims, 16 Drawing Sheets

(51) Int. Cl.
  *G06F 3/0482* (2013.01)
  *G06T 11/00* (2006.01)
  *H04L 51/10* (2022.01)
(52) U.S. Cl.
  CPC .............. *G06T 11/00* (2013.01); *H04L 51/10* (2013.01); *G06F 2203/04804* (2013.01); *G06T 2200/24* (2013.01)

(56) References Cited

FOREIGN PATENT DOCUMENTS

| CN | 103701993 | A |   | 4/2014  |           |
|----|-----------|---|---|---------|-----------|
| CN | 106126353 | A |   | 11/2016 |           |
| CN | 305154660 | S |   | 5/2019  |           |
| CN | 110262715 | A |   | 9/2019  |           |
| CN | 305420253 | S |   | 11/2019 |           |
| CN | 110658960 | A |   | 1/2020  |           |
| CN | 110888707 | A |   | 3/2020  |           |
| CN | 110913067 | A |   | 3/2020  |           |
| CN | 111309416 | A |   | 6/2020  |           |
| CN | 111740896 | A | * | 10/2020 | ........... H04L 12/185 |
| CN | 111740896 | A |   | 10/2020 |           |
| CN | 112242947 | A |   | 1/2021  |           |
| IN | 110730120 | A |   | 1/2020  |           |

OTHER PUBLICATIONS

Chinese First Office Action for CN Application No. 202011092230.7, 18 pgs.
Extended European Search Report issued Jan. 23, 2024 in European Application No. 21879041.8 (7 pages).

* cited by examiner

INFORMATION PROCESSING METHOD, APPARATUS AND MEDIUM

CROSS-REFERENCE TO RELATED APPLICATIONS

This application is a U.S. National Stage Application under 35 U.S.C. § 371 of International Patent Application No. PCT/CN2021/17548, filed on Jul. 21, 2021, which is based on and claims the priority to the Chinese patent application No. 202011092230.7, filed on Oct. 13, 2020, the disclosures of which are incorporated herein into the present application by reference in their entireties.

TECHNICAL FIELD

The present disclosure relates to the technical field of information processing, and particularly, to an information processing method, apparatus, and medium.

BACKGROUND

Instant Messaging (IM) refers to a service capable of instantly transmitting and receiving Internet information and the like. As the instant messaging applies more and more widely, various applications with the instant messaging function emerge in an endless stream, so that a user can realize communication and interaction with another user at any time.

When the user sends instant messaging information to other users, sometimes the information will be sent by mistake, for example, when the user sends an interested short video to a friend through the instant messaging function in a short-video application, the short video possibly will be sent to others by mistake, which brings an adverse experience to the sender or receiver.

SUMMARY

To solve or at least partially solve the above technical problem, the present disclosure provides an information processing method, apparatus, and medium.

In a first aspect, the present disclosure provides an information processing method comprising:
 displaying target information;
 when a sending operation of a user for the target information is detected, displaying a target control for triggering cancellation of sending the target information; and
 when a first triggering operation of the user for the target control is detected within a preset time duration, canceling sending the target information.

In a second aspect, the present disclosure provides an information processing apparatus comprising:
 a display configured to display target information and to display a target control for triggering cancellation of sending the target information when a sending operation of a user for the target information is detected; and
 a processor configured to cancel sending the target information when a first triggering operation of the user for the target control is detected within a preset time duration.

In a third aspect, the present disclosure provides an information processing apparatus comprising:
 a processor; and
 a memory configured to store executable instructions;
 wherein the processor is configured to read and execute the executable instructions from the memory to implement one or more steps of the information processing method according to the first aspect.

In a fourth aspect, the present disclosure provides a computer-readable storage medium having thereon stored a computer program which, when executed by a processor, causes the processor to implement one or more steps of the information processing method according to the first aspect.

In a fifth aspect, the present disclosure provides a computer program comprising: instructions which, when executed by a processor, cause the processor to perform one or more steps of the information processing method according to the first aspect.

In a sixth aspect, the present disclosure provides a computer program product comprising instructions which, when executed by a processor, cause the processor to perform one or more steps of the information processing method according to the first aspect.

Compared with the related art, the technical solution provided by the embodiments of the present disclosure has the following advantages:
 according to the information processing method, apparatus and medium of the embodiments of the present disclosure, in the process of displaying the target information, when the sending operation of the user for the target information is detected, instead of directly sending the target information, a target control is displayed for triggering the cancellation of sending the target information, and if the first triggering operation of the user for the target control is detected within a preset time duration, sending the target information can be cancelled, so as to provide the user with time for finding and stopping the target information being sent by mistake and prevent the target information from being sent by mistake, thereby avoiding an adverse experience to the sender or receiver and improving the use experience of the user.

BRIEF DESCRIPTION OF THE DRAWINGS

The above and other features, advantages, and aspects of the embodiments of the present disclosure will become more apparent with reference to the following implementations when taken in conjunction with the accompanying drawings. Throughout the accompanying drawings, identical or similar reference numbers represent identical or similar elements. It should be understood that the accompanying drawings are schematic and that parts and elements are not necessarily drawn to scale.

DETAILED DESCRIPTION

Figure 1:
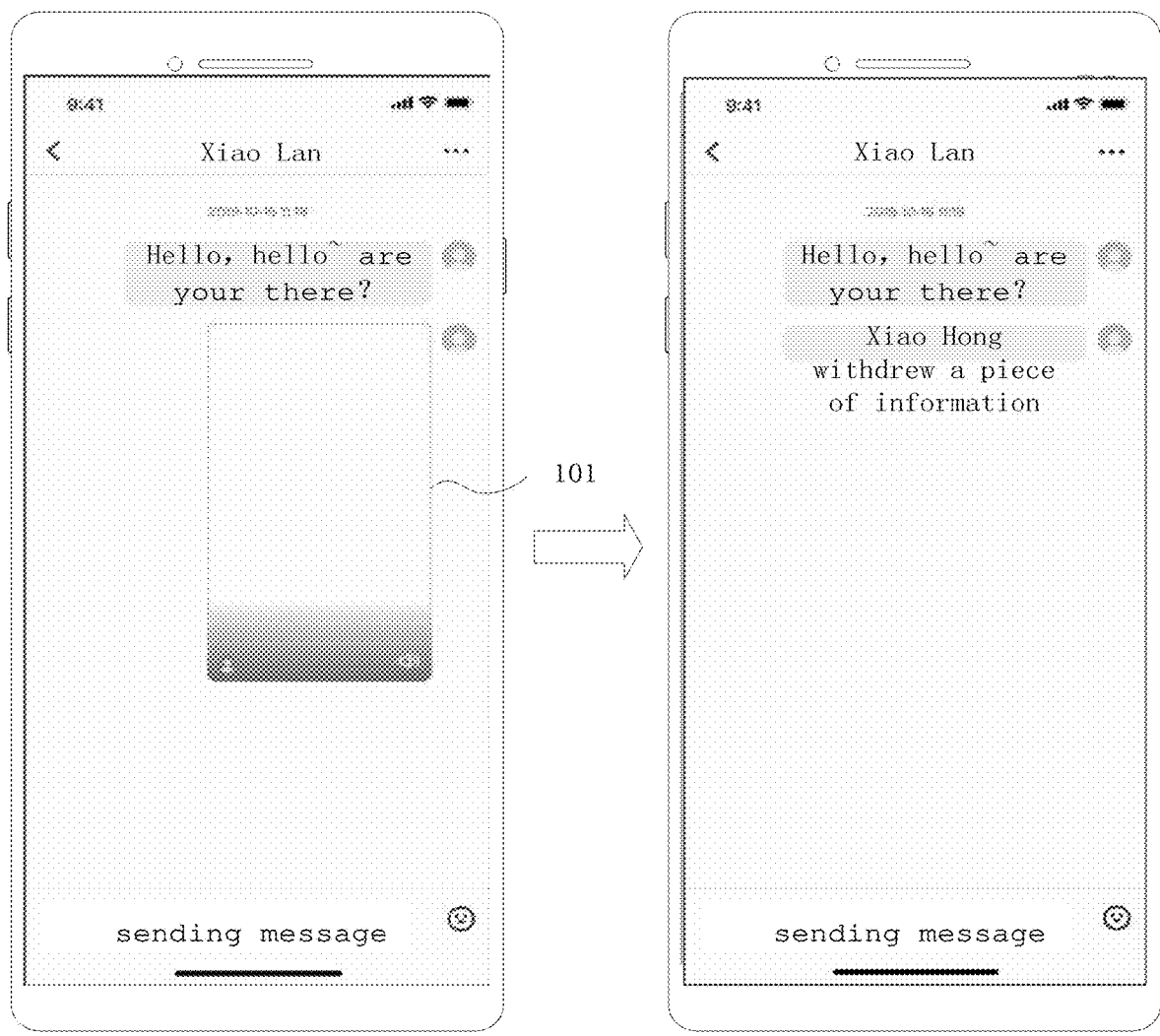
FIG. 1 is a diagram of an information processing scenario in the related art.

Embodiments of the present disclosure will be described in more detail below with reference to the accompanying drawings. While certain embodiments of the present disclosure are shown in the accompanying drawings, it should be understood that the present disclosure can be implemented in various forms and should not be construed as being limited to the embodiments set forth herein, and conversely, these embodiments are provided for a more complete and thorough understanding of the present disclosure. It should be understood that the accompanying drawings and the embodiments of the present disclosure are only for an exemplary purpose and are not intended to limit the protection scope of the present disclosure.

It should be understood that steps recited in a method implementation of the present disclosure can be performed in a different order and/or in parallel. Moreover, the method implementation can comprise additional steps and/or omit performing the shown steps. The scope of the present disclosure is not limited in this respect.

A term "comprising" and its variations used herein are intended to be open-minded, i.e., "comprising but not limited to". A term "based on" is "at least partially based on". A term "one embodiment" indicates "at least one embodiment"; a term "another embodiment" indicates "at least one other embodiment"; and a term "some embodiments" indicates "at least some embodiments". Relevant definitions of other terms will be given in the following description.

It should be noted that concepts such as "first", "second", mentioned in the present disclosure are only used for distinguishing different apparatuses, modules or units, and are not used for limiting the order or interdependence of functions performed by the apparatuses, modules or units.

It should be noted that modifiers "a", "a plurality of" mentioned in the present disclosure are intended to be illustrative rather than restrictive, and it should be appreciated by those skilled in the art that they should be understood as "one or more" unless otherwise clearly indicated in the context.

Names of messages or information interacted between a plurality of apparatuses in the implementations of the present disclosure are only for illustration, and are not intended to limit the scope of the messages or information.

When a user sends instant messaging information to another user, the information will be sent by mistake sometimes, for example, the user may find that an object receiving the information may not be an object with which the user wishes to share the information, or that the sent information may not be the information that the user wishes to send. Taking as an example that the user sends an interested short video to a friend through an instant messaging function in a short-video application, the user possibly will send the short video to others by mistake, which brings an adverse experience to the sender or receiver.

To solve the above problem, the instant messaging function in the related art allows the user to withdraw the information within a certain period of time after instant sending of the information has been completed, so as to prevent the object receiving the information from viewing the information that is not intended to be sent thereto.

FIG. 1 shows a diagram of an information processing scenario in the related art.

As shown in FIG. 1, after a user Xiao Hong sends a short video 101 to a user Xiao Lan through a short-video application, the user Xiao Lan can instantly receive the short video 101 in an instant messaging interface between the users Xiao Hong and Xiao Lan, such as a message interface. When the user Xiao Hong finds that she does not wish to send the short video 101 to the user Xiao Lan, she can withdraw the short video 101 having been received by the user Xiao Lan through a withdrawal function.

However, since the user Xiao Lan has received the short video 101 instantly when the user Xiao Hong sends the short video 101 to the user Xiao Lan, the user Xiao Lan can still view the short video 101 before the user Xiao Hong withdraws the short video 101.

In addition, even if the user Xiao Lan does not view the short video 101 shared by the user Xiao Hong, after the user Xiao Hong withdraws the short video 101, one piece of prompt information for prompting that the user Xiao Hong has withdrawn one piece of information will be displayed in the message interface between the users Xiao Hong and Xiao Lan, for example, the prompt information can be "Xiao Hong withdrew a piece of information". Thus, the user Xiao Lan can still learn that the user Xiao Hong had ever sent the information to her, which also affects the use experience of the user.

It can be seen that the method of withdrawing the information to prevent the information from being sent by mistake, which is provided by the art known to inventors, still brings inconvenience or adverse experience to the sender or receiver of the information.

Therefore, in order to better solve the above problem, an embodiment of the present disclosure provides an information processing method. The information processing method provided by the present disclosure can be applied in an architecture shown in FIG. 2, which will be described in detail in conjunction with FIG. 2.

Figure 2:
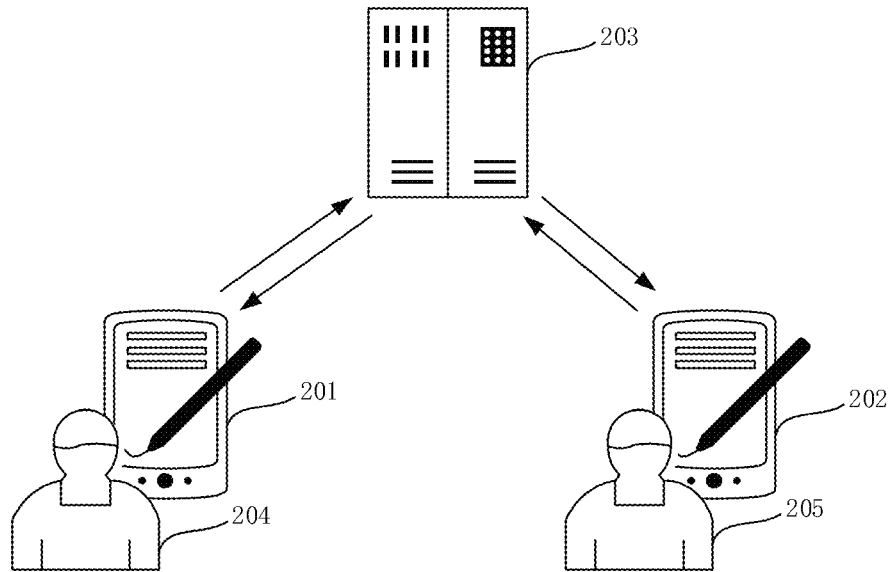
FIG. 2 is a diagram of an information processing architecture provided by an embodiment of the present disclosure.

FIG. 2 shows a diagram of an information processing architecture provided by an embodiment of the present disclosure.

As shown in FIG. 2, in the architecture diagram can be comprised at least one information sending device 201 and at least one information receiving device 202 on a client side, and at least one server 203 on a server side. The information sending device 201 and the information receiving device 202 can separately establish a connection and perform information interaction with the server 203 through a network protocol such as a Hyper Text Transfer Protocol over Secure Socket Layer (HTTPS).

The information sending device 201 and the information receiving device 202 herein can be electronic devices. The electronic device can be a device with a communication function, such as a mobile phone, a tablet computer, a desktop computer, a notebook computer, a vehicle-mounted terminal, a wearable device, an all-in-one machine, an intelligent home device, and can also be a device simulated by a virtual machine or simulator. The server 203 can be a device with storage and computing functions, such as a cloud server or a server cluster.

Based on the above architecture, a user A 204 can, when accessing an application on the information sending device 201 or accessing a specific website through the information sending device 201, send an instant messaging information through the instant messaging function of the application or the specific website to a specified friend, for example, a user B 205 using the information receiving device 202.

In the process of displaying target information, when a sending operation of the user A 204 for the target information is detected, instead of directly sending the target information, the information sending device 201 displays, to the user A 204, a target control for triggering cancellation of sending the target information. If a first triggering operation of the user A 204 for the target control is detected within a preset time duration, sending the target information can be cancelled, to provide the user A 204 with time for finding the target information being sent by mistake and stop sending the target information to prevent the information from being sent by mistake, thereby avoiding an adverse experience to the sender or receiver and improving the use experience of the user; and if the first triggering operation of the user A 204 for the target control is not detected within the preset time duration, the target information is directly sent, to ensure timely delivery of the information and improve the use experience of the user.

Continually taking as an example that the user A 204 accesses the application on the information sending device 201, in the case where the application is a short-video application, the target information can be a short video interested by the user A 204 (e.g., a short video "Fight Between Cat and Dog"). In the process of displaying the short video interested by the user A 204 on the information sending device 201, when the short video "Fight Between Cat and Dog" displayed on the information sending device 201 is the short video interested by the user A 204, the user A 204 can perform the sending operation for the interested short video, so as to send the short video "Fight Between Cat and Dog" to the user B 105 by using the instant messaging function (such as the information sending function) of the short video application. When the information sending device 201 detects the sending operation of the user A 204 for the short video, instead of directly sending the short video, it displays the target control for triggering the cancellation of sending the short video. If the first triggering operation of the user A 204 for the cancellation control is detected within the preset time duration, sending the short video can be cancelled. In this way, when the user A 204 shares the short video with another user by using the instant messaging function of the short video application, e.g., information sending, the information sending device 201 can provide the user A 204 with the time for finding the short video being sent by mistake, and stop sending the short video to prevent the information from being sent by mistake, thereby avoiding an adverse experience to the sender or receiver and improving the use experience of the user. If the first triggering operation of the user A 204 for the target control is not detected within the preset time duration, the short video can be directly sent, to ensure timely delivery of the information and improve the use experience of the user.

Further, the information sending device 201 can send to the server 203 a sending request carrying the target information and an account of the user B 205. After receiving the sending request, the server 203 can send the target information to the application on which the account of the logged-in user B 205 runs or the information receiving device 202 of the specific website, to enable the user B 205 to receive the target information through the instant messaging function, so that the instant sending of the target information is completed.

According to the above architecture, an information processing method provided by an embodiment of the present disclosure will be described below with reference to FIGS. 3 to 17. In some embodiments, the information processing method can be performed by the information sending device 201 in the client shown in FIG. 2. In other embodiments, when the information receiving device 202 in the client shown in FIG. 2 is used for sending the information to another device, the information processing method can also be performed by the information receiving device 202, which is not limited herein. The information sending device 201 and the information receiving device 202 herein can be electronic devices. The electronic device can be a device with a communication function, such as a mobile phone, a tablet computer, a desktop computer, a notebook computer, a vehicle-mounted terminal, a wearable device, an all-in-one machine, an intelligent home device, and can also be a device simulated by a virtual machine or simulator.

Figure 3:
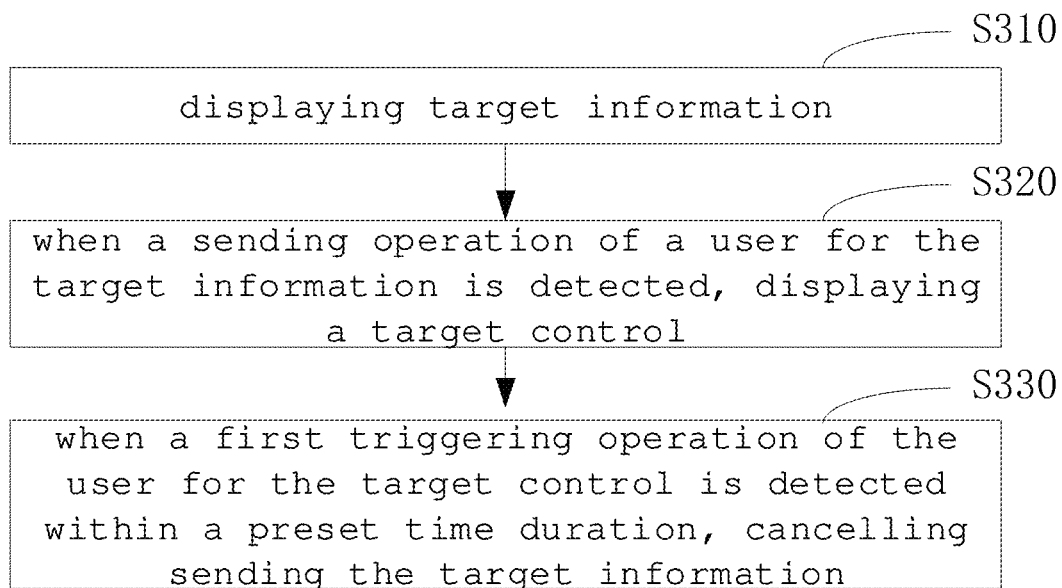
FIG. 3 is a schematic flowchart of an information processing method provided by an embodiment of the present disclosure.

FIG. 3 shows a schematic flowchart of an information processing method provided by an embodiment of the present disclosure.

As shown in FIG. 3, the information processing method can comprise the following steps.

S310, displaying target information.

The target information displayed by the information sending device herein can be information to be sent.

In an embodiment of the present disclosure, the target information can comprise any of image, text, video, audio, etc., or a combination thereof.

Optionally, the image can comprise a dynamic image or a static image.

Optionally, the video can comprise a video having an arbitrary duration. In one embodiment, the video can comprise a short video.

S320, when a sending operation of a user for the target information is detected, displaying a target control for triggering cancellation of sending the target information.

In an embodiment of the present disclosure, when the user wishes to send the target information, the sending operation for the target information can be inputted into the information sending device.

In some embodiments, the sending operation can be an operation inputted into the message interface, for triggering sending the target information. For example, the sending operation can be a click operation directed to a send button or a send icon in the message interface. At this time, when the information sending device detects the click operation of the user for the send button or the send icon in the message interface, it can be determined that the sending operation of the user for the target information is detected.

In other embodiments, the sending operation can further comprise the sending operation for triggering forwarding or sharing the target information, etc. An exemplary method of detecting the sending operation of the user for the target information will be described in detail thereinafter.

In an embodiment of the present disclosure, when the information sending device detects that the user inputs the sending operation for the target information, instead of directly sending the target information, the information sending device displays the target control, so that the user can trigger the cancellation of sending the target information through the target control.

Optionally, the target control can comprise at least one of: target prompt information or a cancellation control.

The target prompt information herein can be used for indicating that the information sending device is sending the target information. For example, the target prompt information can be displayed as "sending . . . ". The target prompt information can further comprise text prompt information, a prompt image, a prompt icon, and the like, which is not limited by the present disclosure. The cancellation control can comprise a button or icon for triggering the cancellation of sending the target information, for example, the cancellation control can be a cancel button or a cancel icon, which is not limited by the present disclosure.

In some embodiments of the present disclosure, the target control can comprise the target prompt information.

In some embodiments, the target prompt information can be superimposed on any position of the target information. Taking the target information being short video as an example, the target prompt information can be superimposed on top, in the middle or on the bottom of the short-video screen. In other embodiments, the target prompt information can also be displayed in a display area outside the target information, which is not limited herein.

In some embodiments, the target prompt information can be displayed in a pop-up window. In other embodiments, the target prompt information can also be displayed in a status bar. In still other embodiments, the target prompt information can also be displayed directly, which is not limited herein.

Figure 4:
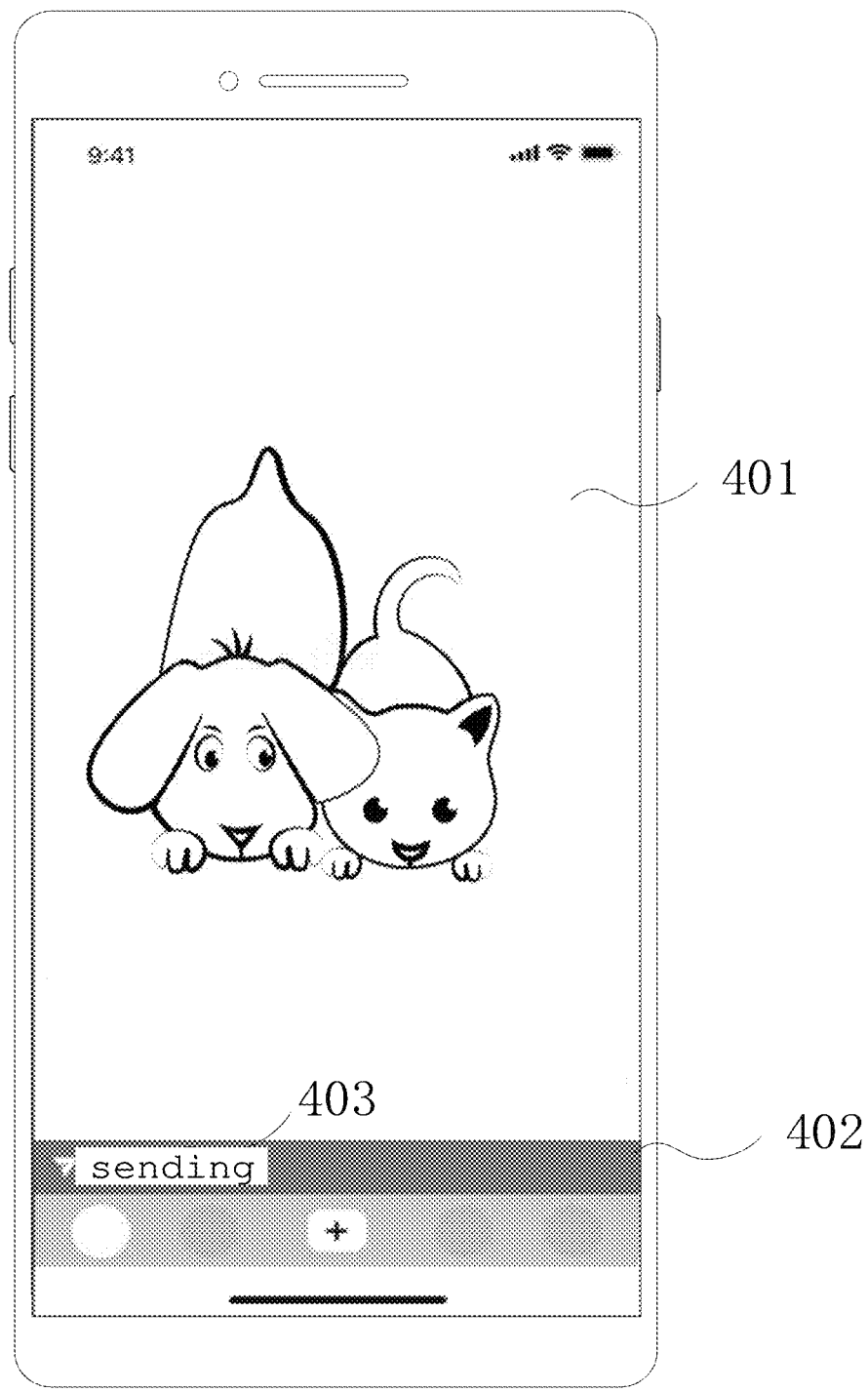
FIG. 4 is a schematic diagram of an information sending waiting page provided by an embodiment of the present disclosure.

FIG. 4 shows a schematic diagram of an information sending waiting page provided by an embodiment of the present disclosure. As shown in FIG. 4, the information sending waiting page can comprise a short video 401, a status bar 402, and target prompt information 403. The status bar 402 herein can be superimposed on the bottom of the short video 401 screen, the target prompt information 403 can comprise a text "sending . . . " and its corresponding icon, and the target prompt information 403 can be displayed in the status bar 402.

In other embodiments of the present disclosure, the target control can also comprise the cancellation control.

In some embodiments, the cancellation control can be superimposed on any position of the target information. Taking the target information being short video as an example, the cancellation control can be superimposed on top, in the middle, on the bottom or at any vertex angle of the short-video screen. In other embodiments, the cancellation control can also be displayed in a display area outside the target information, which is not limited herein.

Figure 5:
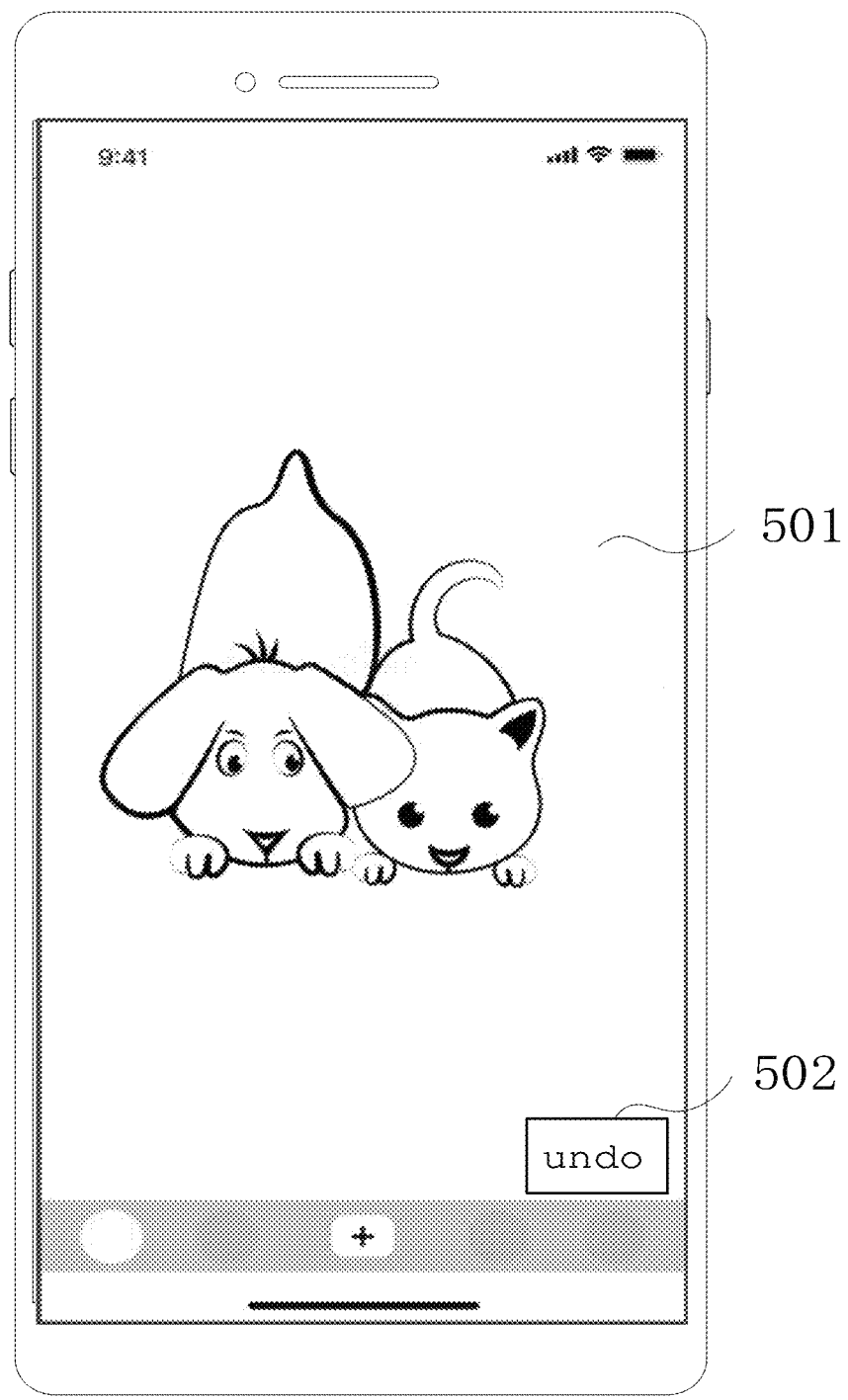
FIG. 5 is a schematic diagram of another information sending waiting page provided by an embodiment of the present disclosure.

FIG. 5 is a schematic diagram illustrating another information sending waiting page provided by an embodiment of the present disclosure. As shown in FIG. 5, the information sending waiting page can comprise a short video 501 and a cancel button 502, and the cancel button 502 can be an "undo" button. The cancel button 502 herein can be superimposed on a lower right corner of the short video 501 screen.

In still other embodiments of the present disclosure, the target control can comprise target prompt information and a cancellation control.

Optionally, the target prompt information and the cancellation control can be displayed integrally (e.g., displayed together in the status bar) or separately (e.g., displayed separately at different positions of the short-video screen).

In some embodiments, in the case where the target prompt information and the cancellation control are displayed integrally, the target prompt information and the cancellation control can be superimposed on any position of the target information. Taking the target information being short video as an example, the target prompt information and the cancellation control can be superimposed on top, in the middle or on the bottom of the short-video screen. In other embodiments, the target prompt information and the cancellation control can also be displayed in a display area outside the target information, which is not limited herein.

In some embodiments, the target prompt information and the cancellation control can be displayed in a pop-up window. In other embodiments, the target prompt information and the cancellation control can also be displayed in a status bar. In still other embodiments, the target prompt information and the cancellation control can also be displayed directly, which is not limited herein.

Figure 6:
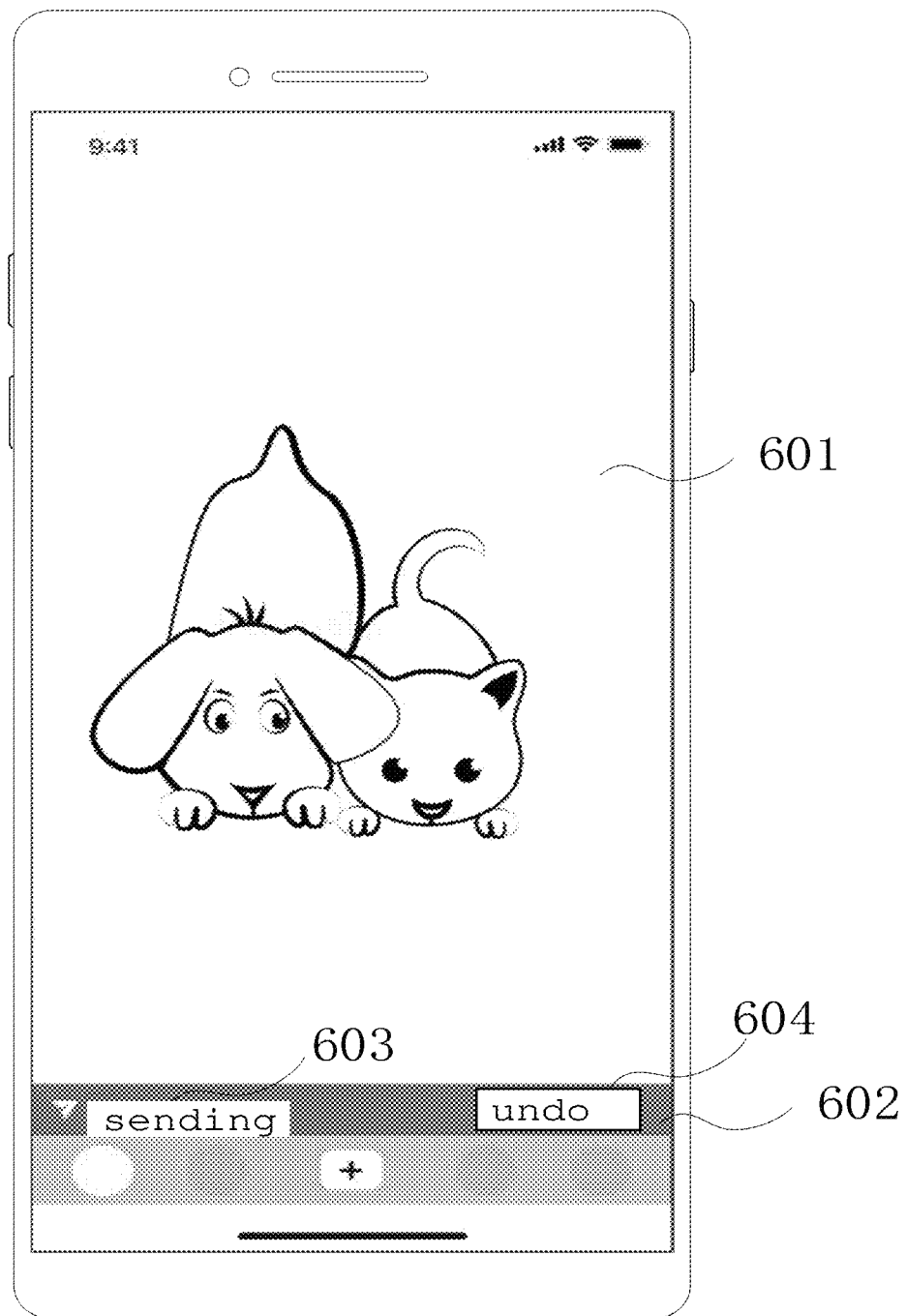
FIG. 6 is a schematic diagram of still another information sending waiting page provided by an embodiment of the present disclosure.

FIG. 6 shows a schematic diagram of still another information sending waiting page provided by an embodiment of the present disclosure. As shown in FIG. 6, the information sending waiting page can comprise a short video 601, a status bar 602, target prompt information 603, and a cancel button 604. Herein, the status bar 602 can be superimposed on the bottom of the short video 601 screen, the target prompt information 603 can comprise a text "sending . . . " and its corresponding icon, the target prompt information 603 and the cancel button 604 can be separately displayed in the status bar 602, the target prompt information 603 can be located on a left side of the status bar 602, the cancel button 604 can be located on a right side of the status bar 602, and the cancel button 604 can be an "undo" button.

Returning to FIG. 3, in step S330, when the first triggering operation of the user for the target control is detected within the preset time duration, sending the target information is cancelled.

The first triggering operation herein can be any of a click operation, a double-click operation, a long-press operation, etc., inputted by the user, or a voice instruction issued by the user, which is not limited herein.

In some embodiments, in the case where the target control comprises the target prompt information, the first triggering operation can comprise the triggering operation for the target prompt information.

In other embodiments, in the case where the target control comprises the cancellation control, the first triggering operation can comprise a triggering operation for the cancellation control.

In still other embodiments, in the case where the target control comprises the target prompt information and the cancellation control, the first triggering operation can comprise the triggering operation for the cancellation control.

In an embodiment of the present disclosure, the information sending device can, after detecting the sending operation of the user for the target information, wait for the preset time duration, and if the first triggering operation of the user for the target control is detected within the preset time duration, it is determined that the user wishes to cancel sending the target information, and the information sending device can cancel sending the target information.

It should be noted that the preset time duration can be preset by the information sending device, or can be set by the user as needed, which is not limited herein.

Optionally, in order to ensure the reliability of the user canceling the wrong sending and the instantaneity of the instant messaging, the preset time duration can be set to be 3 seconds to 5 seconds, for example, the preset time duration can be 3 seconds.

In the embodiment of the present disclosure, in the process of displaying the target information, when the sending operation of the user for the target information is detected, instead of directly sending the target information, the target control for triggering the cancellation of sending the target information is displayed, and if the first triggering operation of the user for the target control is detected within the preset time duration, sending the target information can be cancelled, so as to provide the user with the time for finding the target information being sent by mistake and stop sending the target information, to avoid the target information from being sent by mistake, thereby avoiding an adverse effect to the sender or receiver and improving the use experience of the user.

In some embodiments of the present disclosure, after S330, the information processing method can further comprise:

displaying first prompt information for indicating that the information sending device has cancelled sending the target information. For example, the first prompt information can be displayed as "sending cancelled".

In some embodiments, the first prompt information can be superimposed on any position of the target information. Taking the target information being short video as an example, the first prompt information can be superimposed on top, in the middle or on the bottom of the short-video screen. In other embodiments, the first prompt information can also be displayed in a display area outside the target information, which is not limited herein.

In some embodiments, the first prompt information can be displayed in a pop-up window. In other embodiments, the first prompt information can also be displayed in a status bar. In still other embodiments, the first prompt information can also be displayed directly, which is not limited herein.

It should be noted that the display mode of the first prompt information can be similar to that of the target prompt information, which is not repeated herein for brevity.

Figure 7:
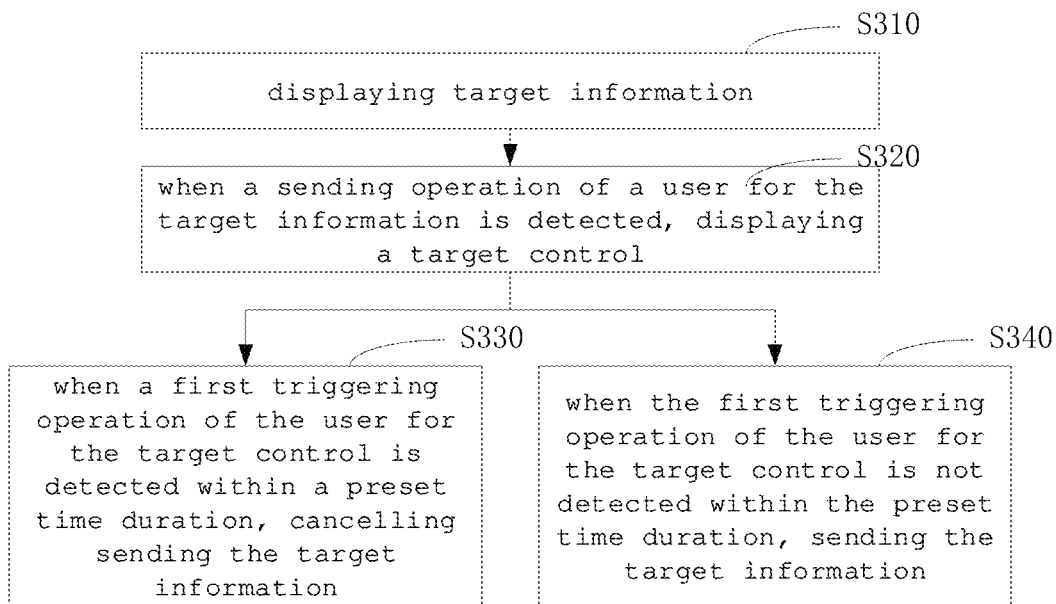
FIG. 7 is a schematic flowchart of another information processing method provided by an embodiment of the present disclosure.

FIG. 7 shows a schematic flowchart of another information processing method provided by an embodiment of the present disclosure.

As shown in FIG. 7, the information processing method can comprise the following steps.

S310, displaying target information.

S320, when a sending operation of a user for the target information is detected, displaying a target control for triggering cancellation of sending the target information.

S330, when a first triggering operation of the user for the target control is detected within a preset time duration, cancelling sending the target information.

The steps S310 to S330 herein have already been described in conjunction with the embodiment shown in FIG. 3, which are not repeated herein for brevity.

S340, when the first triggering operation of the user for the target control is not detected within the preset time duration, sending the target information.

In the embodiments of the present disclosure, the information sending device can, after detecting the sending operation of the user for the target information, wait for the preset time duration, and if the first triggering operation of the user for the target control is not detected within the preset time duration, it is determined that the user wishes to continue sending the target information, and the information sending device can send the target information, so as to ensure timely delivery of the information and improve the use experience of the user.

In some embodiments of the present disclosure, after S340, the information processing method can further comprise:

displaying second prompt information for indicating that the target information has been sent. For example, the second prompt information can be displayed as "sent successfully".

In some embodiments, the second prompt information can be superimposed on any position of the target information. Taking the target information being short video as an example, the second prompt information can be superimposed on top, in the middle or on the bottom of the short-video screen. In other embodiments, the second prompt information can also be displayed in a display area outside the target information, which is not limited herein.

In some embodiments, the second prompt information can be displayed in a pop-up window. In other embodiments, the second prompt information can also be displayed in a status bar. In still other embodiments, the second prompt information can also be displayed directly, which is not limited herein.

It should be noted that the display mode of the second prompt information is similar to that of the target prompt information, which is not repeated herein for brevity.

In other embodiments of the present disclosure, after displaying the second prompt information, the information processing method can further comprise:

receiving a communication interface triggering operation of the user for the second prompt information; and in response to the communication interface triggering operation, displaying a target instant messaging interface which is an instant messaging interface (e.g., message interface) between the user and the sending object of the target information.

The communication interface triggering operation herein can comprise any of a click operation, a long-press operation, and a double-click operation for the second prompt information.

Specifically, after the information sending device displays the second prompt information, the user can click the second prompt information, so that the information sending device skips to display the instant messaging interface such as the message interface between the user and the sending object of the target information, as shown in FIG. 1.

In order to further avoid the information from being sent by mistake, in another implementation of the present disclosure is further provided still another information processing method.

Specifically, in an embodiment of the present disclosure, when the sending operation of the user for the target information is detected, the information processing method can further comprise:

intercepting the target information;

timing an interception duration of the target information; and detecting the first triggering operation of the user for the target control.

Herein, when the sending operation of the user for the target information is detected, an execution order of the step of "displaying the target control" and the step of "intercepting the target information" can be adjusted randomly as needed. Specifically, the step of "displaying the target control" and the step of "intercepting the target information" can be executed synchronously, or the step of "displaying the target control" can be executed before the step of "intercepting the target information" is executed, or the step of "intercepting the target information" can be executed before the step of "displaying the target control" is executed, which is not limited herein.

The above information processing method will be described in detail below.

Figure 8:
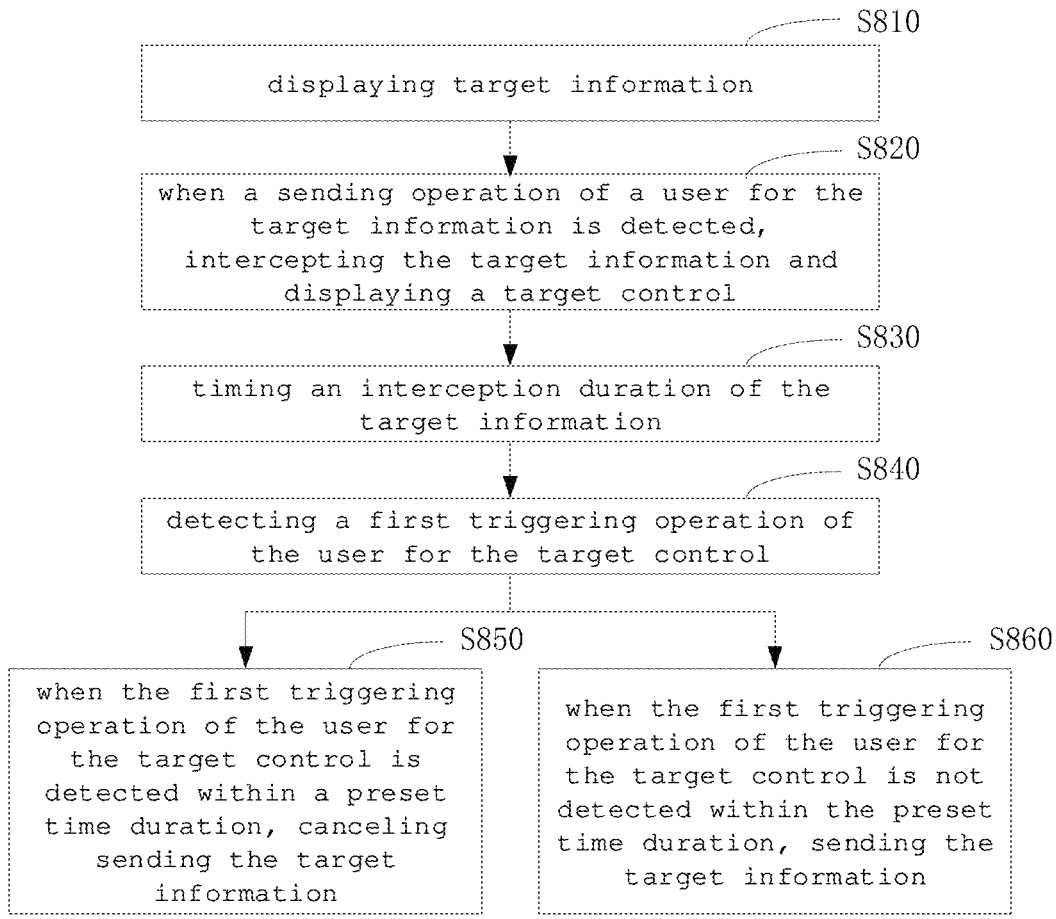
FIG. 8 is a schematic flowchart of still another information processing method provided by an embodiment of the present disclosure.

FIG. 8 shows a schematic flowchart of another information processing method provided by an embodiment of the present disclosure.

As shown in FIG. 8, the information processing method can comprise the following steps.

S810, displaying the target information.

The S810 herein is similar to the S310 in the embodiment shown in FIG. 3, which is not repeated herein for brevity.

S820, when the sending operation of the user for the target information is detected, intercepting the target information and displaying the target control for triggering the cancellation of sending the target information.

In the embodiment of the present disclosure, when the information sending device detects the sending operation of the user for the target information, instead of directly sending the target information, it suspends sending the target information and caches the target information to intercept the target information.

Herein, "displaying the target control for triggering the cancellation of sending the target information" in the S820 is similar to that of the S320 in the embodiment shown in FIG. 3, which is not repeated herein for brevity.

S830, timing the interception duration of the target information.

In the embodiment of the present disclosure, after suspending sending the target information, instead of directly terminating sending the target information, the information sending device waits for the first triggering operation of the user for the target control, and times the interception duration of intercepting the target information.

S840, detecting the first triggering operation of the user for the target control.

In the embodiment of the present disclosure, in the process of timing the interception duration of intercepting the target information, if the interception duration is less than or equal to the preset time duration, the information sending device continuously detects the first triggering operation of the user for the target control, and then continuously detects whether the user has an intention of canceling sending the target information.

S850, when the first triggering operation of the user for the target control is detected within the preset time duration, canceling sending the target information.

The S850 herein is similar to the S330 in the embodiment shown in FIG. 3, which is not repeated herein for brevity.

S860, when the first triggering operation of the user for the target control is not detected within the preset time duration, sending the target information.

The S860 herein is similar to the S340 in the embodiment shown in FIG. 7, which is not repeated herein for brevity.

Therefore, in the embodiment of the present disclosure, in the process of displaying the target information, when the sending operation of the user for the target information is detected, instead of directly sending the target information, the target information is intercepted locally and its interception duration is timed, and in the case where the interception duration is less than or equal to the preset time duration, the first triggering operation of the user for the target control is detected to form an intermediate state of waiting for sending the target information. Once the first triggering operation of the user for the target control is detected within the preset time duration, it is determined that the user has an intention to cancel sending the target information, and sending the target information can be cancelled immediately, so that the target information will not be delivered to the sending object; the user can be provided with the time for finding the target information being sent by mistake, and sending the target information is stopped to prevent the target information from being sent by mistake, thereby avoiding an adverse effect to the sender or receiver and improving the use experience of the user. In addition, when the first triggering operation of the user for the target control is not detected within the preset time duration, it is determined that the user does not have the intention to cancel sending the target information, and the target information can be sent immediately, so as to ensure the timely delivery of the information and improve the use experience of the user.

In still another implementation of the present disclosure, in order to improve the information sending efficiency, the sending operation can be the sending operation for triggering forwarding or sharing the target information, etc. An exemplary method of detecting the sending operation of the user for the target information will be described below by taking as an example that the sending operation is the sending operation for triggering sharing the target information.

Figure 9:
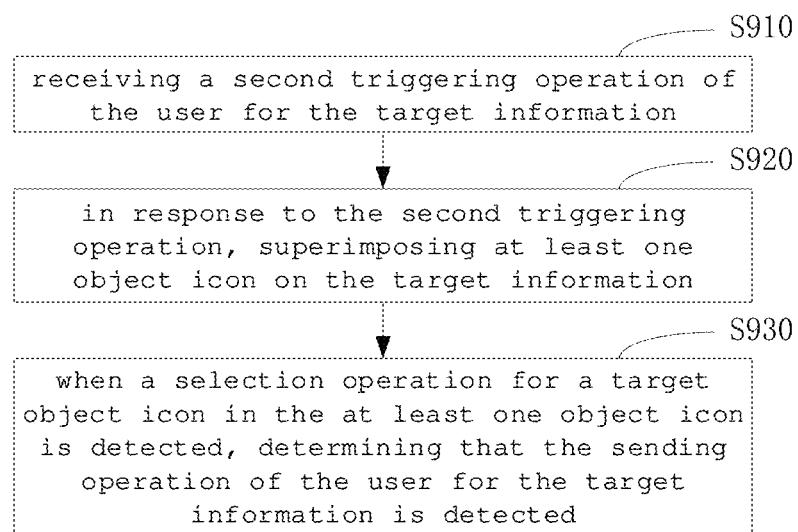
FIG. 9 is a schematic flowchart of a sending operation detection method provided by an embodiment of the present disclosure.

FIG. 9 shows a schematic flowchart of a sending operation detection method provided by an embodiment of the present disclosure.

As shown in FIG. 9, the detecting the sending operation of the user for the target information can specifically comprise:

S910, receiving a second triggering operation of the user for the target information.

The second triggering operation herein can comprise any of a click operation, a long-press operation, a double-click operation, a drag operation in a specified direction, a rotation operation, and the like, which is not limited herein.

S920, in response to the second triggering operation, superimposing at least one object icon on the target information, each object icon corresponding to one selectable object.

In an embodiment of the present disclosure, the selectable object can comprise at least one of a user object and an application object. In the case where the selectable object comprises the user object, the object icon can be a user avatar. In the case where the selectable object comprises the application object, the object icon can be an application icon.

The user object can comprise a user having a social relationship with the user operating the information sending device, for example, a user having a social relationship with the user operating the information sending device in an application to which the target information belongs. Specifically, the user having the social relationship with the user operating the information sending device can be at least one of: a user having a friend relationship with the user operating the information sending device, a user following and followed by the user operating the information sending device, and a user followed by the user operating the information sending device. Furthermore, the user object can also comprise the user operating the information sending device.

The application object can comprise applications installed and/or not installed in the information sending device. Specifically, the user operating the information sending device can, through the application object, send the target information to a user in the application object, so that the user can instantly send the target information to the user in the application object; or, the user operating the information sending device can also send the target information to a social platform in the application object through the application object, so that the user can present the target information in the social platform in the application object; and it should be noted that the target information can also be sent into the application object in other manners and be presented in other manners, which is not limited herein. For example, an application installed in the information sending device can be in an optional state, and an application not installed in the information sending device can be in a non-optional state.

S930, when a selection operation for a target object icon in the at least one object icon is detected, determining that the sending operation of the user for the target information is detected.

In an embodiment of the present disclosure, the target object icon can be the object icon for a selection operation of the user. When the information sending device detects the selection operation for the target object icon in the at least one object icon, it can be determined that the sending operation of the user for the target information is detected.

Optionally, the selection operation can be any of a click operation, a double-click operation, a long-press operation, a voice operation, etc., for the target object icon, which is not limited herein.

In an embodiment of the present disclosure, in the case where the sending operation is the selection operation for the target object icon in the at least one object icon, the target prompt information can be used for indicating that the information sending device is sending the target information to a target object corresponding to the target object icon. For example, the target object is Xiao Lan, and the target prompt information can be displayed as "being sent to Xiao Lan . . . ".

In an embodiment of the present disclosure, in the S920, the at least one object icon can be superimposed on any position of the target information. Specifically, the at least one object icon can cover the whole target information display, and can also be displayed on an upper half of the target information, or on a lower half of the target information, or in the middle of the target information, which is not limited herein.

Taking the target information being short video as an example, the at least one object icon can be superimposed on the short-video screen; specifically, the at least one object icon can cover the whole short-video screen, and can also be displayed on an upper half of the short-video screen, or on a lower half of the short-video screen, or in the middle of the short-video screen, which is not limited herein.

In an embodiment of the present disclosure, in the S920, the superimposing at least one object icon on the target information can specifically be: providing a floating layer on the target information, the at least one object icon being displayed in the floating layer.

Optionally, the floating layer can cover at least a portion of the target information. Specifically, the floating layer can cover the whole target information, and can also cover the upper half of the target information, or the lower half of the target information, or the middle of the target information, which is not limited herein.

Figure 10:
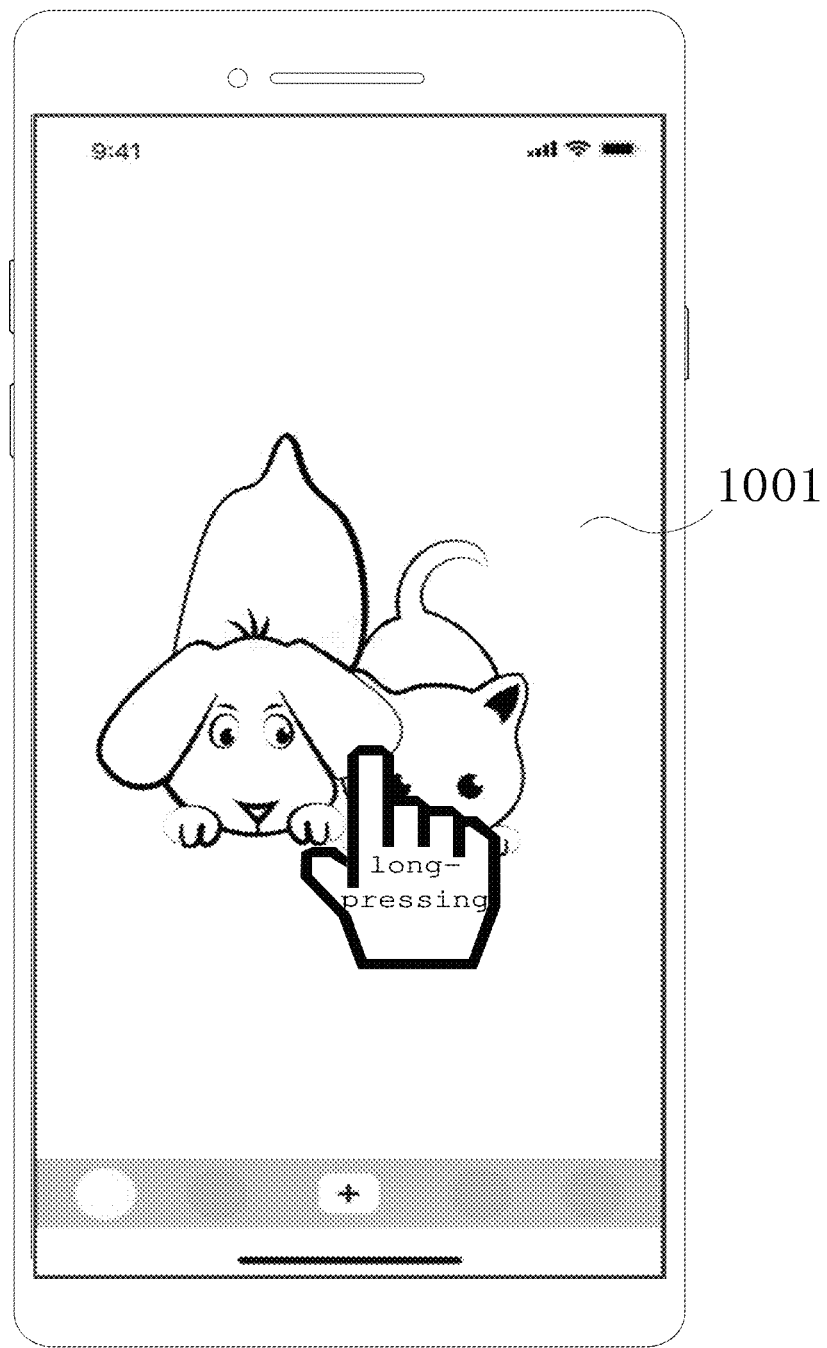
FIG. 10 is a schematic diagram of a short-video display interface provided by an embodiment of the present disclosure.

FIG. 10 is a schematic diagram of a short-video display interface provided by an embodiment of the present disclosure. As shown in FIG. 10, taking the target information being short video as an example, the information sending device can display a short video 1001. If the short video 1001 is the short video interested by the user, the user can long-press the short video 1001 to share the short video 1001.

Figure 11:
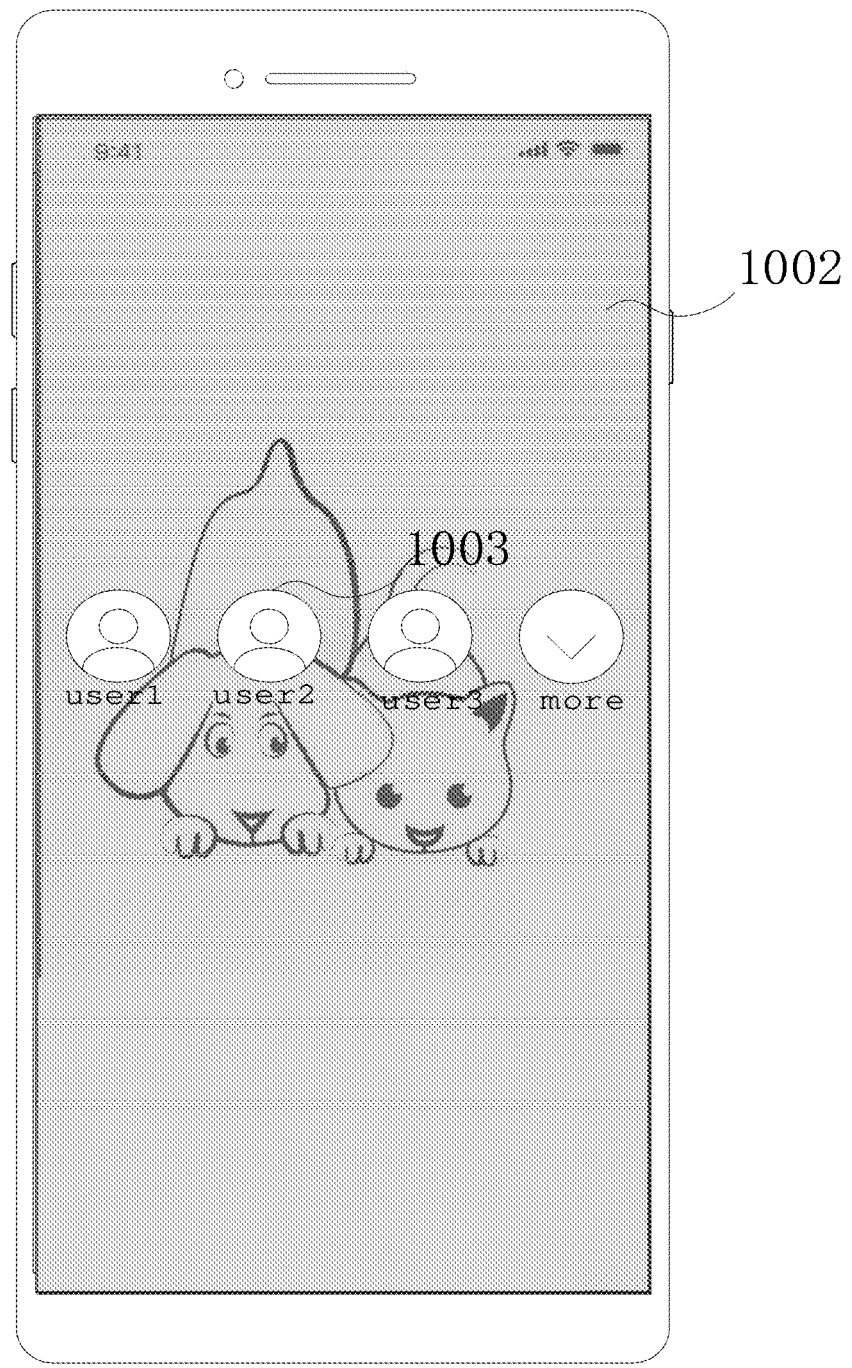
FIG. 11 is a schematic diagram of an object icon display interface provided by an embodiment of the present disclosure.

FIG. 11 shows a schematic diagram of an object icon display interface provided by an embodiment of the present disclosure. As shown in FIG. 11, after the information sending device receives the long-press operation of the user for the short video 1001, a floating layer 1002 can be provided. The floating layer 1002 can cover the whole short video 1001 and have a preset transparency so that the user can continue viewing the short video 1001 through the floating layer 1002. At least one user avatar 1003 can be displayed in the floating layer 1002, and each user avatar 1003 can correspond to another user to whom the user can send the short video 1001. The user can click any of the at least one user avatar 1003, and the information sending device can, after receiving the click operation of the user for any of the at least one user avatar 1003, determine that the sending operation of the user for the short video 1001 is detected.

In some embodiments, continually referring to FIG. 11, the at least one user avatar 1003 can be located in the middle of the short video 1001, i.e., in the middle of the floating layer 1002.

It should be noted that in FIG. 11, for better illustration and explanation, the floating layer 1002 is set to be gray, but it should be understood by those skilled in the art that the floating layer 1002 can be set to be any color, such as black, white, etc. The color of the floating layer 1002 can be preset, or can be set by the user as needed, which is not limited herein.

Figure 12:
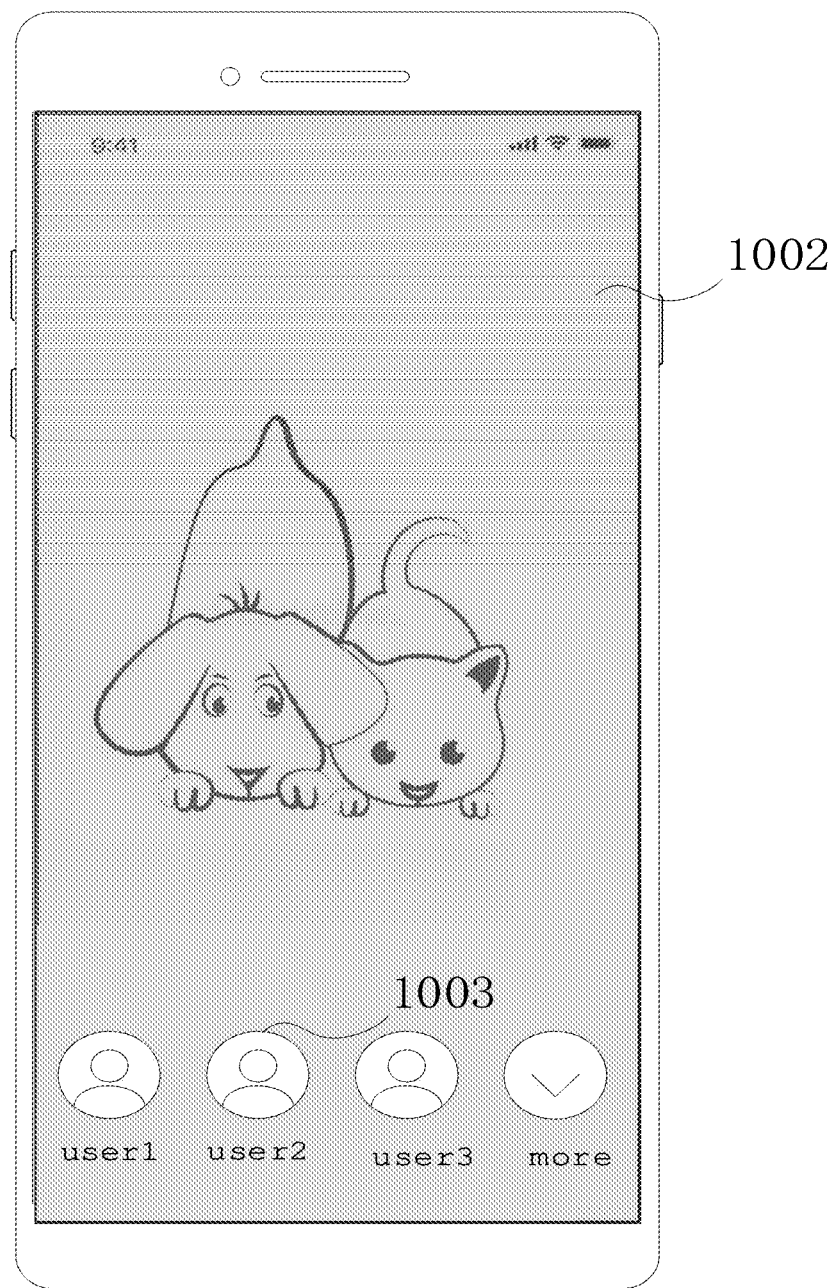
FIG. 12 is a schematic diagram of another object icon display interface provided by an embodiment of the present disclosure.

FIG. 12 shows a schematic diagram of another object icon display interface provided by an embodiment of the present disclosure. In other embodiments, as shown in FIG. 12, the at least one user avatar 1003 can be located on the bottom of the short video 1001, i.e., the bottom of the floating layer 1002.

In the embodiment of the present disclosure, optionally, in the S920, the superimposing at least one object icon on the target information can specifically comprise:

sequentially superimposing the object icons of the plurality of selectable objects on the target information according to an object priority of each selectable object.

Specifically, the information sending device can first acquire the object priority of each selectable object, which can be determined according to historical interaction data between the selectable object and the user, then sort the plurality of object icons according to the object priority of each selectable object, and finally sequentially superimpose the object icons of the plurality of selectable objects on the target information in an order of the object priorities from high to low.

In some embodiments, in the case where the selectable object is the user object, the historical interaction data can comprise social relationship data and historical communication data. The social relationship data can comprise attentions between the selectable object and the user, and the historical communication data can comprise a historical communication frequency between the selectable object and the user within a preset time period. Specifically, if there is no communication between the selectable object and the user within the preset time period, the historical communication frequency between the selectable object and the user within the preset time period can be zero.

Optionally, the historical communication data can also comprise latest communication time between the selectable object and the user.

In these embodiments, optionally, the determining the object priority according to historical interaction data between the selectable object and the user can specifically comprise:

taking selectable objects following and followed by the user as a first priority group, and then determining a priority of each selectable object in the first priority group according to historical communication frequencies between the selectable objects and the user within the preset time period from high to low; taking selectable objects followed by the user as a second priority group, and then determining a priority of each selectable object in the second priority group according to historical communication frequencies between the selectable objects and the user within the preset time period from high to low. In the case where the historical communication frequencies corresponding to two or more selectable objects are the same, priorities of the selectable objects can be further determined according to their latest communication time, and the closer the latest communication time is to the current time, the higher the priority of the selectable object is.

In other embodiments, in the case where the selectable object is the application object, the historical interaction data can comprise application installation data and historical usage data. The application installation data herein can comprise installation of the application, and the historical usage data can comprise a historical usage frequency of the application by the user within the preset time period. Specifically, if the user has not used the application within the preset time period, the historical usage frequency of the application by the user within the preset time period can be zero.

Optionally, the historical communication data can also comprise latest usage time of the application by the user.

In these embodiments, optionally, the determining the object priority according to historical interaction data between the selectable object and the user can specifically comprise:

taking applications installed in the information sending device as a first priority group, and then determining a priority of each selectable object in the first priority group according to historical usage frequencies of the applications by the user within the preset time period from high to low; and taking applications not installed in the information sending device as a second priority group in which a priority of each selectable object is the same. In the case where historical usage frequencies corresponding to two or more selectable objects are the same, priorities of the selectable objects can be further determined according to their latest usage time, and the closer the latest usage time is to the current time, the higher the priority of the selectable object is.

It should be noted that the above preset time period can be set as needed, which is not limited herein. For example, the preset time period can be one day, one week, or one month.

In an embodiment of the present disclosure, optionally, the object priority can be determined by the information sending device according to the historical interaction data between the selectable object and the user, or by the server 203 shown in FIG. 2 according to the historical interaction data between the selectable object and the user, which is not limited herein.

In some embodiments of the present disclosure, the sequentially superimposing the object icons of the plurality of selectable objects on the target information can specifically be: sequentially superimposing the object icons of all selectable objects on the target information.

In other embodiments of the present disclosure, the sequentially superimposing the object icons of the plurality of selectable objects on the target information can specifically be: sequentially superimposing object icons of a preset number of selectable objects on the target information.

The preset number herein can be preset, or set as needed by the user, which is not limited herein.

Continually referring to FIG. 11, three user avatars 1003 can be displayed in the middle of the short video 1001, and at this time, the preset number can be 3.

Further, in the case where the object priorities of two or more selectable objects are the same, the object icons of the selectable objects can be displayed in a random order.

In another embodiment of the present disclosure, in order to improve the display effect, after it is determined that the sending operation of the user for the target information is detected and before the target control is displayed, the information processing method can further comprise:

hiding the object icon.

Specifically, after determining that the sending operation of the user for the target information is detected, the information sending device can hide the object icon first, and then display the target control, which can reduce the shielding of the target information and facilitate the user to continue viewing the target information.

Taking the target information being short video and the object icon being user avatar as an example, after determining that the sending operation of the user for the short video is detected, the information sending device can hide the user avatar first, and then display the target control, which can reduce the shielding of the user avatar to the short video, facilitate the user to continue viewing the short video, and improve the display effect and the use experience of the user.

In still another embodiment of the present disclosure, in the case where the target information is a video, in order to improve display reliability of the video, after the second triggering operation of the user for the target information is received, the information processing method can further comprise:

keeping a playing state of the video.

Optionally, the playing state of the video comprises any of play and pause.

Specifically, in the case where the target information is a video, after the information sending device receives the second triggering operation of the user for the target information, it keeps playing the video if the playing state of the video is playing when receiving the second triggering operation of the user for the target information, and it keeps pausing the video if the playing state of the video is pausing when receiving the second triggering operation of the user for the target information.

Therefore, in the embodiment of the present disclosure, the display reliability of the video can be improved, and the use experience of the user can be further improved.

In further embodiments of the present disclosure, after the second triggering operation of the user for the target information is received, the information processing method can further comprise:

superimposing a function list on the target information.

The function list herein can comprise at least one function option, and each function option corresponds to one functional operation. For example, the functional option can comprise an option to save the target information, an option to collect the target information, an option to report the target information, an option to like the target information, and so on.

In an embodiment of the present disclosure, the function list can be displayed at any position on the target information. Specifically, the function list can be displayed below or above the at least one object icon.

In the case where the at least one object icon is displayed on top of the target information, the function list can be displayed below the at least one object icon. In the case where the at least one object icon is displayed on the bottom of the target information, the function list can be displayed above the at least one object icon. In the case where the at least one object icon is displayed in the middle of the target information, the function list can be displayed adjacently above or below the at least one object icon.

In the embodiment of the present disclosure, optionally, when an arbitrary function option in the function list is not available, the function option can be grayed out to be in a non-optional state, and other function options not grayed out are kept in an optional state.

For example, if a publisher of the target information sets a non-downloadable attribute for the target information when publishing the target information, an option to save the target information is not available, and the option to save the target information can be grayed out to avoid the target information from being downloaded by mistake, so as to ensure rights and interests of the publisher.

Figure 13:
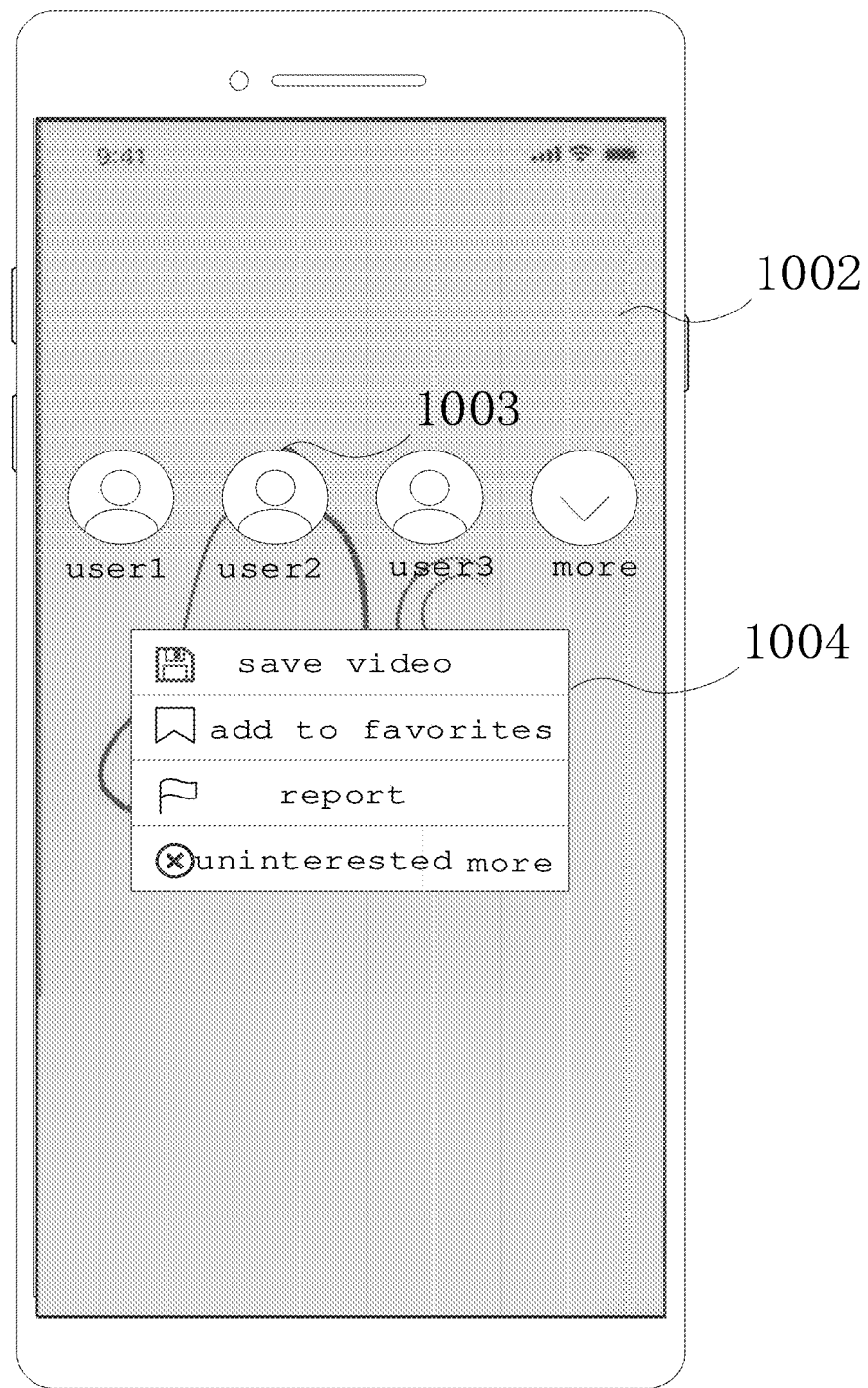
FIG. 13 is a schematic diagram of a function list display interface provided by an embodiment of the present disclosure.

FIG. 13 shows a schematic diagram of a function list display interface provided by an embodiment of the present disclosure. As shown in FIG. 13, continually taking the target information being short video as an example, after the information sending device receives a long-press operation of the user on the short video 1001, the floating layer 1002 can be provided. The floating layer 1002 has a preset transparency so that the user can continue viewing the short video 1001 through the floating layer 1002. The at least one user avatar 1003 and a function list 1004 can be displayed in the floating layer 1002.

Each user avatar 1003 can correspond to another user to whom the user can send the short video 1001. The user can click any of the at least one user avatar 1003, and the information sending device can determine that the sending operation of the user for the short video 1001 is detected after receiving the click operation of the user for any of the at least one user avatar 1003.

The function list 1004 can be displayed adjacently below the at least one user avatar 1003. The function list 1004 can comprise a "save video" option, an "add to favorites" option, a "report" option, an "uninterested" option, and a "more" option. The user can click the "save video" option to cause the information sending device to save the short video 1001; the user can also click the "add to favorites" option to add it to the favorites under his account; the user can also click the "report" option to send report information to the server; the user can also click the "uninterested" option to indicate that the user is uninterested in the short video, and so on; and the user can also click the "more" option to cause the information sending device to display other function options not currently displayed.

In some embodiments, continually referring to FIG. 13, the at least one user avatar 1003 can be located on top of the middle area of the short video 1001, and the function list 1004 can be located below the user avatar 1003, i.e., on the bottom of the middle area of the short video 1001.

In further embodiments of the present disclosure, after the function list is superimposed on the target information, the information processing method can further comprise:

receiving a transparency adjustment operation of the user for the function list; and in response to the transparency adjustment operation, adjusting a transparency of the function list to a target transparency indicated by the transparency adjustment operation.

The transparency adjustment operation herein can be a long-press operation for the function list, or an operation for a transparency adjustment control for controlling the function list, which is not limited herein.

Optionally, the target transparency can be a target transparency selected when the transparency adjustment operation is stopped.

In the case where the transparency adjustment operation is the long-press operation for the function list, the information sending device can acquire a time duration or a pressure of long-pressing the function list, and according to a correspondence preset between the time duration or pressure and the transparency, a transparency corresponding to the time duration or the pressure when the long-press operation is stopped is taken as the target transparency selected by the user, thereby setting the function list as the target transparency.

Figure 14:
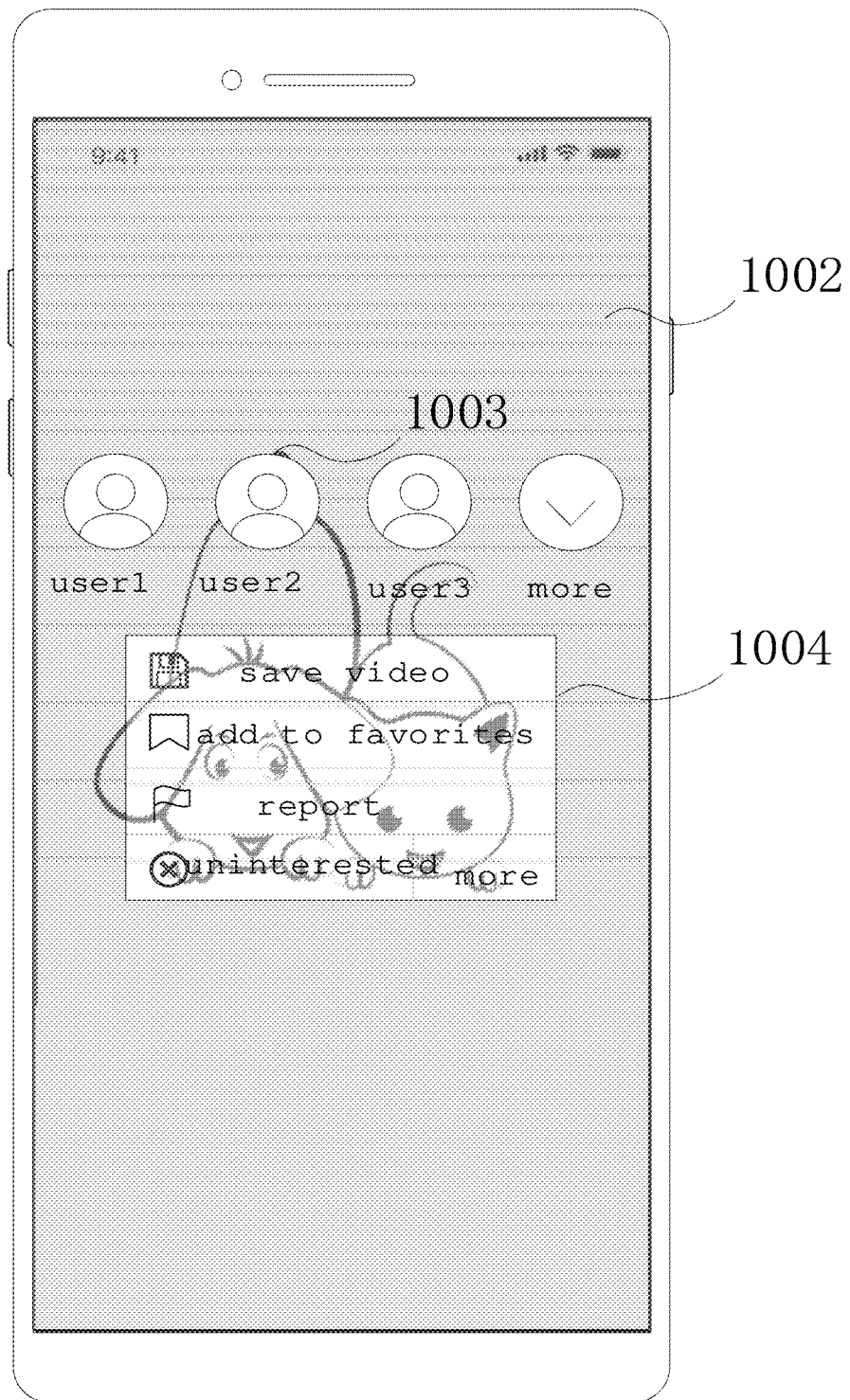
FIG. 14 is a schematic diagram of another function list display interface provided by an embodiment of the present disclosure.

FIG. 14 shows a schematic diagram of another function list display interface provided by an embodiment of the present disclosure. First, continually referring to FIG. 13, the transparency of the function list 1004 can be 0, and at this time, the function list 1004 obscures the short video at its position. If the user wants to view the short video obscured by the function list 1004, the function list 1004 can be long-pressed. As shown in FIG. 14, for example, after the user has long-pressed the function list 1004 for one second, the user stops long-pressing the function list 1004, and the information sending device can determine that the transparency corresponding to the long-press time of one second is 50% when the user stops the long-pressing, and thus, the transparency of the function list 1004 can be set as 50% so that the user can view the short video at the position of the function list 1004 through the function list 1004. For another example, after the user has long-pressed the function list 1004 for 3 seconds, the user stops long-pressing the function list 1004, and the information sending device can determine that the transparency corresponding to the long-press time of 3 seconds is 30% when the user stops the long-pressing, and thus, the transparency of the function list 1004 can be set as 30% so that the user can view the short video at the position of the function list 1004 through the function list 1004.

Therefore, in the embodiment of the present disclosure, the transparency of the function list can be adjusted as needed by the user, and the function list is prevented from obscuring the target information, which does not affect the user's viewing of the target information.

In further embodiments of the present disclosure, after superimposing the function list on the target information, the information processing method can further comprise:
  receiving a hiding operation of the user for the function list; and
  in response to the hiding operation, hiding the function list.

The transparency adjustment operation herein can be a double-click operation for the function list, or a click operation for a control for triggering closing the function list, which is not limited herein.

Figure 15:
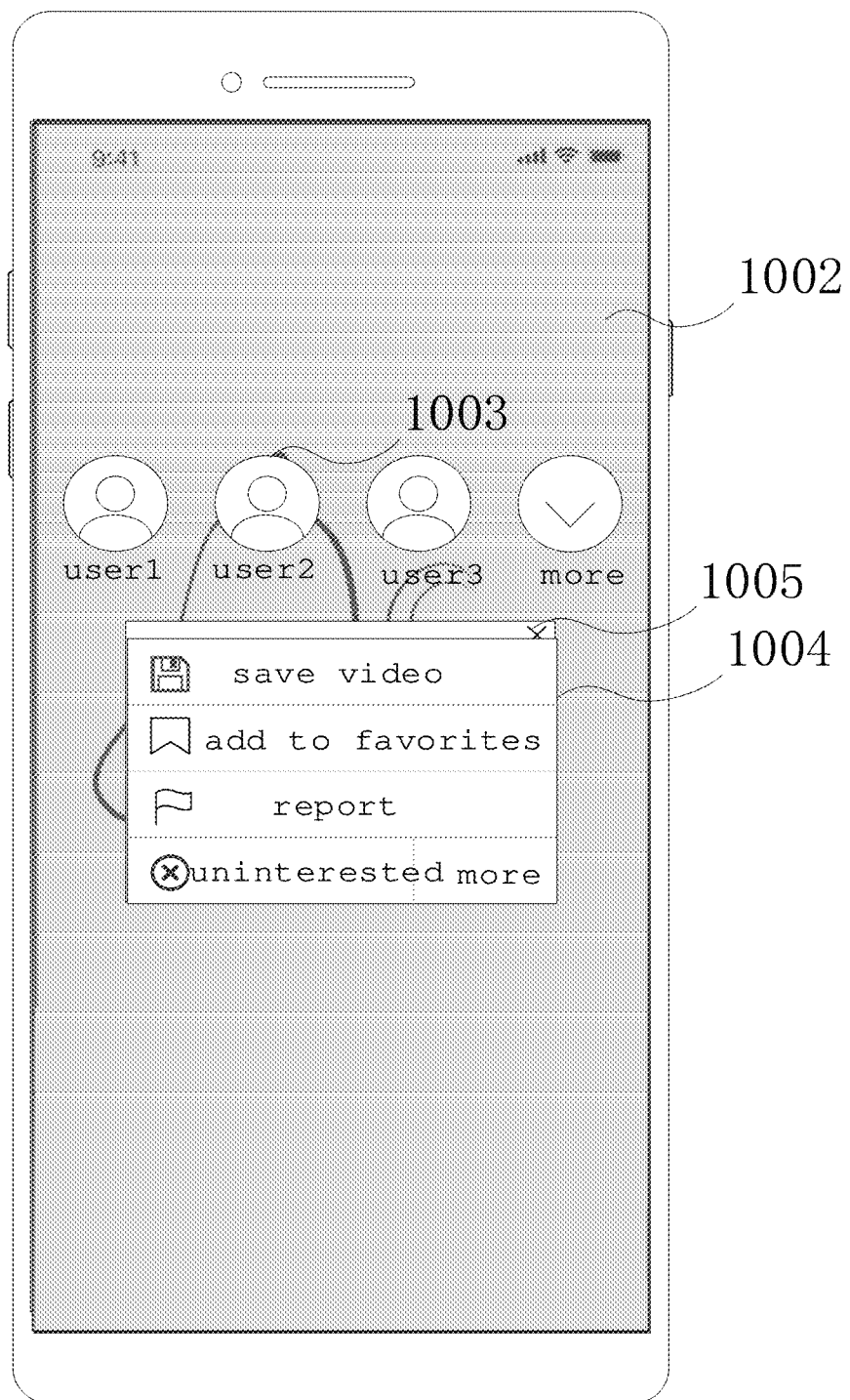
FIG. 15 is a schematic diagram of still another function list display interface provided by an embodiment of the present disclosure.

FIG. 15 shows a schematic diagram of still another function list display interface provided by an embodiment of the present disclosure. As shown in FIG. 15, continually taking the target information being short video as an example, the floating layer 1002 is provided on the short video 1001. The at least one user avatar 1003 and the function list 1004 can be displayed in the floating layer 1002. At an upper right corner of the function list 1004 can be displayed a "close" button 1005, for triggering closing the function list. If the user wants to view the short video obscured by the function list 1004 and the function in the function list 1004 does not need to be triggered, the "close" button 1005 can be clicked so that the information sending device can hide the function list 1004, thereby preventing the function list 1004 from obscuring the short video 1001.

Therefore, in the embodiment of the present disclosure, the function list can be hidden as needed by the user, and the function list is prevented from obscuring the target information, which does not affect the user's viewing of the target information.

In further embodiments of the present disclosure, in the case where the object icons of the preset number of selectable objects are sequentially superimposed on the target information, after the at least one object icon is superimposed on the target information, the information processing method can further comprise:
  receiving a third triggering operation of the user; and
  in response to the third triggering operation, displaying other object icons than the at least one object icon.

In some embodiments, the third triggering operation can be a slide operation to a specified direction in the display area of the at least one object icon.

Optionally, in the case where the third triggering operation is an upward sliding operation in the display area of the at least one object icon, the information sending device can other adjacent object icons following the currently displayed object icon in the order of the object priorities, and update one group of object icons each time when scrolling, the number of object icons in each group being a preset number.

Optionally, in the case where the third triggering operation is a downward sliding operation in the display area of the at least one object icon, the information sending device can scroll other adjacent object icons preceding the currently displayed object icon in the order of the object priorities, and update one group of object icons each time when scrolling, the number of object icons in each group being a preset number.

Optionally, in the case where the third triggering operation is a sliding operation to the left in the display area of the at least one object icon, the information sending device can scroll other adjacent object icons following the currently displayed object icon in the order of the object priorities, and update one object icon each time when scrolling.

Optionally, in the case where the third triggering operation is a slide operation to the right in the display area of the at least one object icon, the information sending device can scroll other adjacent object icons preceding the currently displayed object icon in the order of the object priorities, and update one object icon each time when scrolling.

In other embodiments, the third triggering operation can also be a click operation for an object expansion control.

Specifically, while the at least one object icon is superimposed on the target information, the object expansion control can also be superimposed on the target information, and the object expansion control can be located on a right side of the at least one object icon, for example, the object expansion control can be the "more" button shown in FIGS. 11 to 15. The user can click the object expansion control to cause the information processing apparatus to display the other object icons than the at least one object icon.

In still other embodiments, in the case where the third triggering operation can also be a click operation for the object expansion control, after the third triggering operation of the user is received, the information processing method can further comprise: in response to the third triggering operation, keeping displaying the at least one object icon.

Therefore, after the user inputs the click operation for the object expansion control, the information sending device can display only the other object icons than the at least one object icon, or simultaneously display both the at least one object icon and the other object icons than the at least one object icon, which is not limited herein.

In further embodiments, in the case where the third triggering operation can also be the click operation for the object expansion control, after the third triggering operation of the user is received, the information processing method can further comprise: in response to the third triggering operation, keeping displaying the object expansion control, so as to resume, after the re-click operation of the user for the object expansion control is received, the interface displayed before the third triggering operation of the user has been received.

Two examples will be taken below to describe how the other object icons than the at least one object icon are displayed.

In one example, the user can click the object expansion control to cause the information processing apparatus to display the other object icons than the at least one object icon in full screen.

Specifically, the other object icons can be displayed in full screen in the order of the object priorities from high to low.

Figure 16:
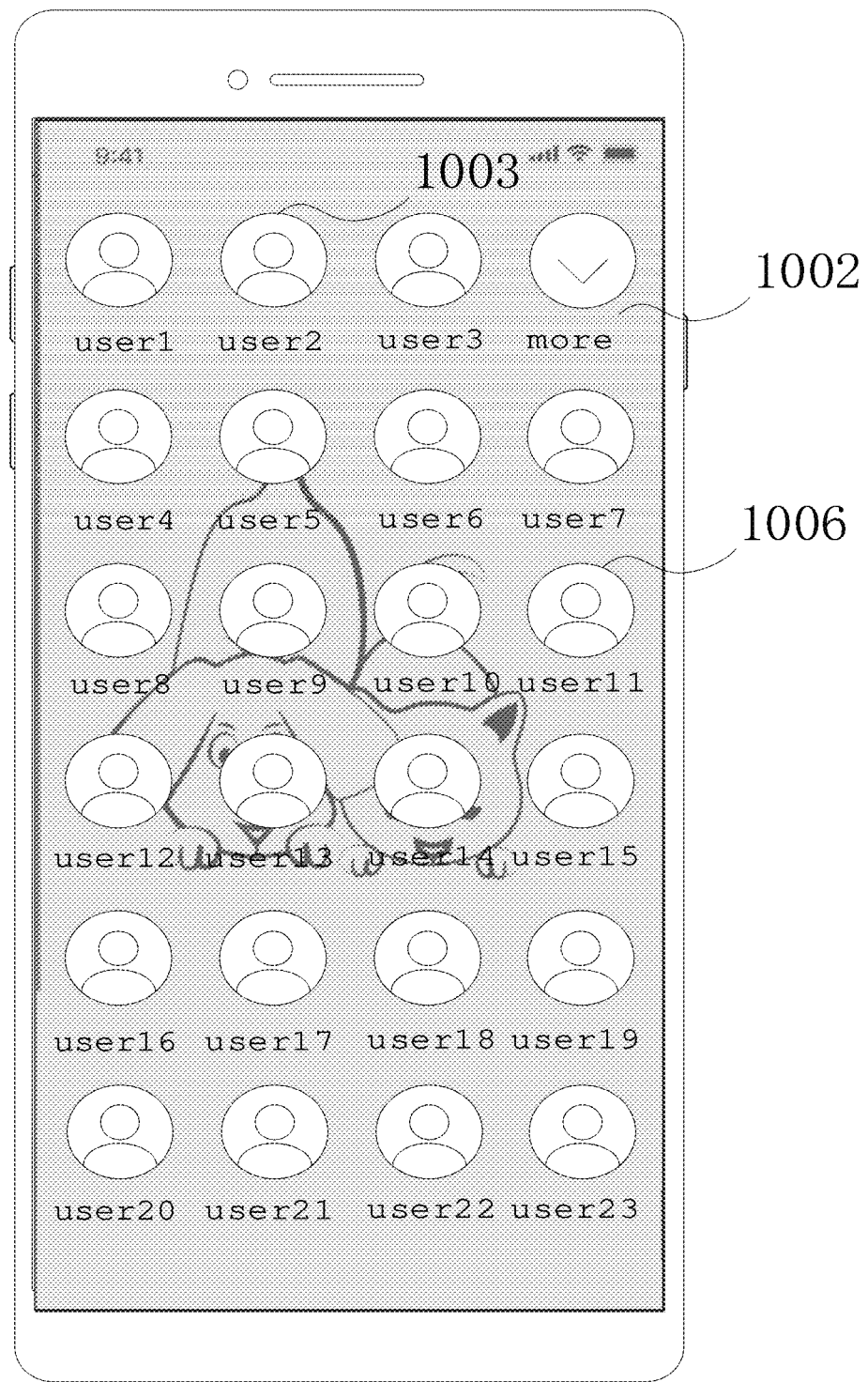
FIG. 16 is a schematic diagram of still another object icon display interface provided by an embodiment of the present disclosure.

FIG. 16 shows a schematic diagram of still another object icon display interface provided by an embodiment of the present disclosure. As shown in FIG. 16, continually taking the target information being short video as an example, the floating layer 1002 is provided on the short video 1001. The at least one user avatar 1003, such as users 1 to 3, and other user avatars 1006 than the at least one user avatar 1003, such as users 4 to 23, can be displayed in full screen in the floating layer 1002.

Therefore, in the embodiment of the present disclosure, the user is enabled to freely select the sending object of the target information, and in the process of selecting the sending object by the user, the target information can be continually viewed, to improve the use experience of the user.

In another example, the user can click the object expansion control to cause the information processing apparatus to replace the function list with the other object icons than the at least one object icon.

Specifically, the other object icons can be displayed in the order of the object priorities from high to low.

Figure 17:
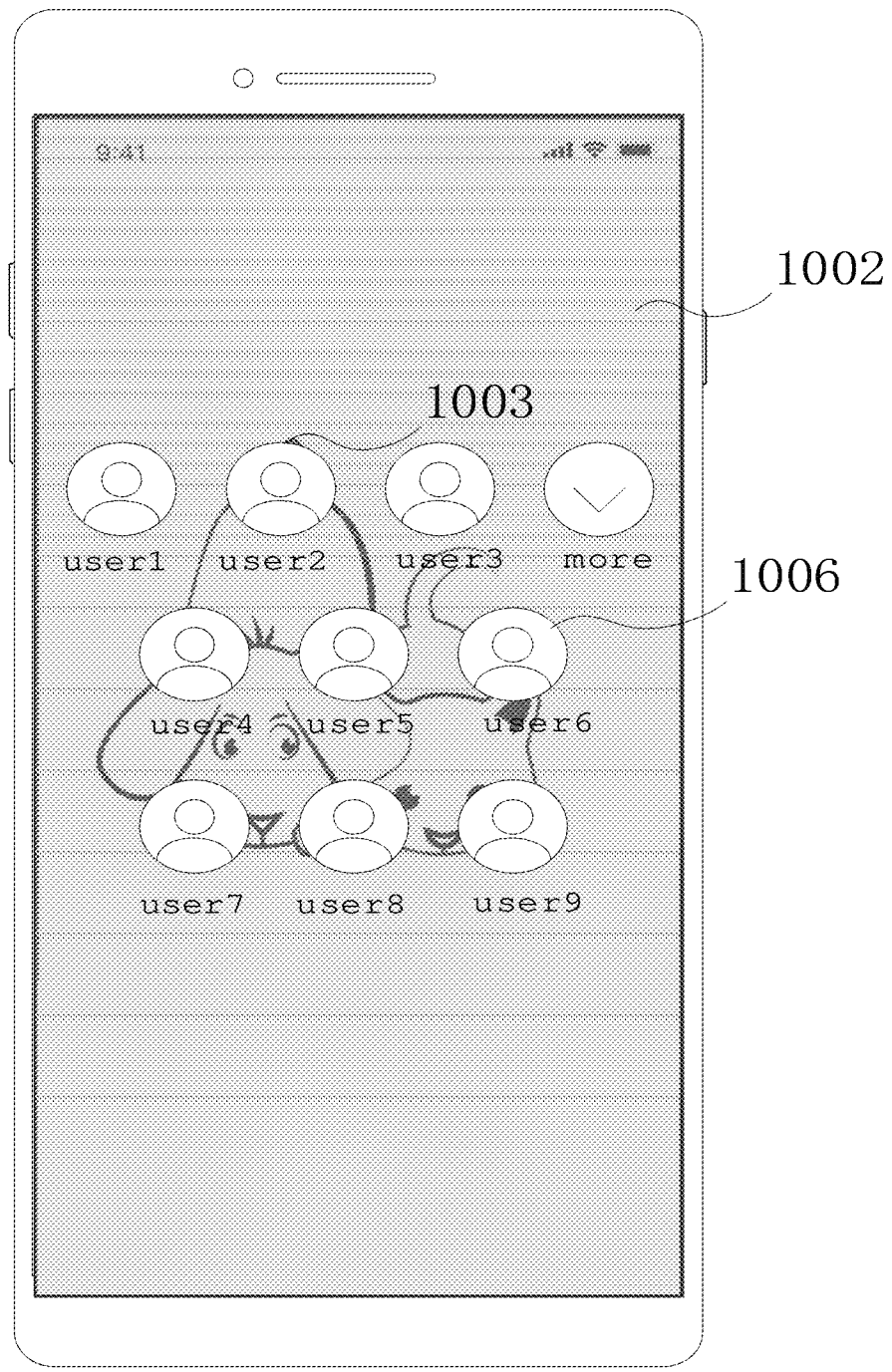
FIG. 17 is a schematic diagram of a further object icon display interface provided by an embodiment of the present disclosure.

FIG. 17 shows a schematic diagram of a further object icon display interface provided by an embodiment of the present disclosure. As shown in FIG. 17, continually taking the target information being short video as an example, the floating layer 1002 is provided on the short video 1001. The at least one user avatar 1003, such as the users 1 to 3, and the other user avatars 1006 than the at least one user avatar 1003, such as the users 4 to 9, can be displayed in the floating layer 1002, and the other user avatars 1006 than the at least one user avatar 1003 can be displayed at the display position of the function list, that is, the function list can be replaced with the other user avatars 1006 than the at least one user avatar 1003.

Therefore, in the embodiment of the present disclosure, the user is enabled to freely select the sending object of the target information, and in the process of selecting the sending object by the user, the object icon can be further prevented from obscuring the target information, and the target information can be continually viewed to improve the use experience of the user.

Figure 18:
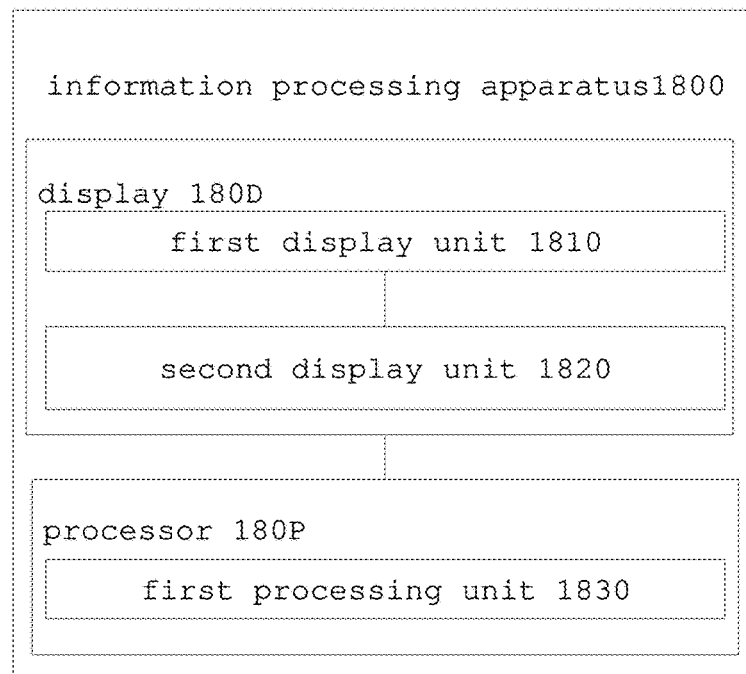
FIG. 18 is a schematic structural diagram of an information processing apparatus provided by an embodiment of the present disclosure.

FIG. 18 shows a schematic structural diagram of an information processing apparatus provided by an embodiment of the present disclosure.

In some embodiments, the information processing apparatus 1800 can be provided in the information sending device 201 in the client shown in FIG. 2. In other embodiments, when the information receiving device 202 in the client shown in FIG. 2 has the function of sending information to another electronic device, the information processing apparatus 1800 can also be provided in the information receiving device 202, which is not limited herein.

As shown in FIG. 18, the information processing apparatus 1800 can comprise: a display 180D comprising a first display unit 1810 and a second display unit 1820; and a processor 180P comprising a first processing unit 1830.

The first display unit 1810 can be configured to display target information.

The second display unit 1820 can be configured to display a target control for triggering cancellation of sending the target information when the sending operation of the user for the target information is detected.

The first processing unit 1830 can be configured to cancel sending the target information when the first triggering operation of the user for the target control is detected within the preset time duration.

The above units can be implemented as software components executed on one or more general-purpose processors, or as hardware executing certain functions or a combination thereof, such as a programmable logic device and/or an application specific integrated circuit. In some embodiments, these units can be embodied in the form of software products that can be stored on non-volatile storage media which contain the method according to the embodiments of the present invention implemented by a computer device (e.g., a personal computer, server, network device, mobile terminal, etc.). In other embodiments, the above units can also be implemented on a single device, or distributed on a plurality of devices. The functions of these units can be combined with each other or further divided into a plurality of sub-units.

In the embodiment of the present disclosure, in the process of displaying the target information, when the sending operation of the user for the target information is detected, instead of directly sending the target information, a target control for triggering the cancellation of sending the target information is displayed, and if the first triggering operation of the user for the target control is detected within a preset time duration, sending the target information can be cancelled, so that the user is provided with the time for finding the target information being sending by mistake, sending the target information is stopped to prevent the target information from being sent by mistake, thereby avoiding an adverse effect to the sender or receiver and improving the use experience of the user.

In some embodiments of the present disclosure, the target control can comprise:
  target prompt information, the first triggering operation comprising a triggering operation for the target prompt information; or,
  the target prompt information and cancellation control, the first triggering operation comprising a triggering operation for the cancellation control; or,
  the cancellation control, the first triggering operation comprising the triggering operation for the cancellation control;
  wherein the target prompt information is used for indicating that the target information is being sent.

In some embodiments of the present disclosure, the information processing apparatus 1800 can further comprise a second processing unit configured to send the target information when the first triggering operation of the user for the target control is not detected within a preset time duration.

In some embodiments of the present disclosure, the information processing apparatus 1800 can further comprise an information interception unit, an interception timing unit, and a third processing unit.

The information interception unit can be configured to intercept the target information.

The interception timing unit can be configured to time the interception duration of the target information.

The third processing unit can be configured to detect the first triggering operation of the user for the target control.

In some embodiments of the present disclosure, the information processing apparatus 1800 can further comprise a first receiving unit, a third display unit, and a fourth processing unit.

The first receiving unit can be configured to receive a second triggering operation of the user for the target information.

The third display unit can be configured to superimpose the at least one object icon on the target information in response to the second triggering operation, each object icon corresponding to one selectable object.

The fourth processing unit can be configured to determine that the sending operation of the user for the target information is detected when the selection operation for the target object icon of the at least one object icon is detected.

In some embodiments of the present disclosure, the information processing apparatus 1800 can further comprise a fourth display unit configured to hide the object icon.

In some embodiments of the present disclosure, the information processing apparatus 1800 can further comprise a fifth processing unit configured to keep the playing state of the video in the case where the target information is video.

In some embodiments of the present disclosure, the third display unit can be further configured to sequentially superimpose the object icons of the plurality of selectable objects on the target information according to the object priority of each selectable object.

In some embodiments of the present disclosure, the information processing apparatus 1800 can further comprise a fifth display unit configured to superimpose the function list on the target information.

In some embodiments of the present disclosure, the information processing apparatus 1800 can further comprise a second receiving unit and a sixth processing unit.

The second receiving unit can be configured to receive the transparency adjustment operation of the user for the function list.

The sixth processing unit can be configured to adjust, in response to the transparency adjustment operation, the transparency of the function list to the target transparency indicated by the transparency adjustment operation.

In some embodiments of the present disclosure, the information processing apparatus 1800 can further comprise a third receiving unit and a sixth display unit.

The third receiving unit can be configured to receive the hiding operation of the user for the function list.

The sixth display unit can be configured to hide the function list in response to the hiding operation.

In some embodiments of the present disclosure, the information processing apparatus 1800 can further comprise a fourth receiving unit and a seventh display unit.

The fourth receiving unit can be configured to receive the third triggering operation of the user.

The seventh display unit can be configured to display, in response to the third triggering operation, the other object icons than the at least one object icon.

It should be noted that the information processing apparatus 1800 shown in FIG. 18 can perform each step in the method embodiments shown in FIGS. 3 to 17, and implement each process and effect in the method embodiments shown in FIGS. 3 to 17, which are not repeated herein.

An embodiment of the present disclosure further provides an information processing apparatus comprising a processor and a memory configured to store executable instructions. The processor can be configured to read the executable instructions from the memory, and execute them to implement one or more steps of the information processing method in the above embodiments.

Figure 19:
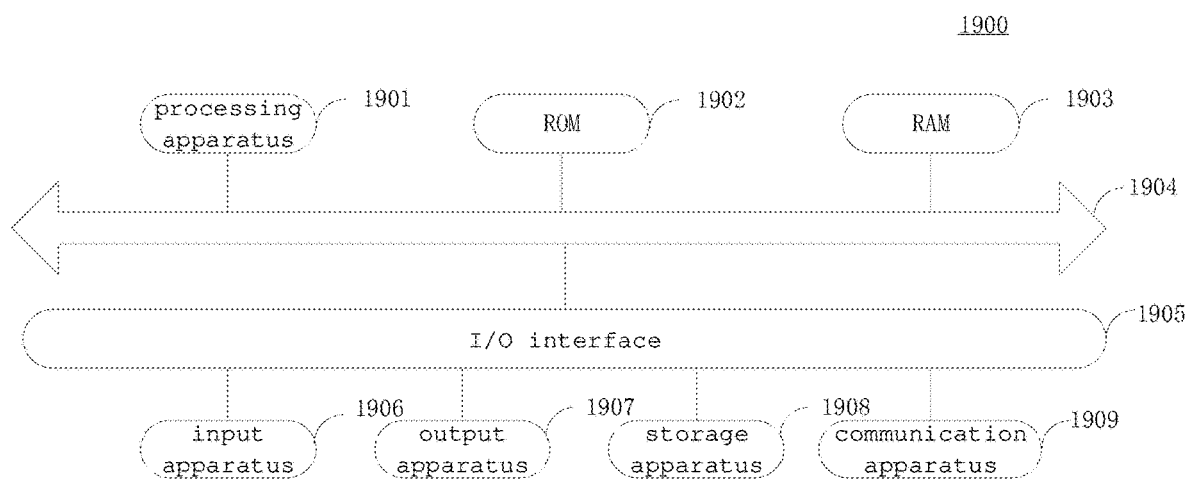
FIG. 19 is a schematic structural diagram of another information processing apparatus provided by an embodiment of the present disclosure.

FIG. 19 shows a schematic structural diagram of an information processing apparatus provided by an embodiment of the present disclosure. Details will be given below with reference to FIG. 19, which shows a schematic structural diagram suitable for implementing an information processing apparatus 1900 in the embodiment of the present disclosure.

The information processing apparatus 1900 in the embodiment of the present disclosure can be an electronic device. In some embodiments, the information processing apparatus 1900 can be the information sending device 201 in the client shown in FIG. 2. In other embodiments, when the information receiving apparatus 202 in the client shown in FIG. 2 has the function of sending information to another electronic device, the information processing apparatus 1900 can also be the information receiving device 202, which is not limited herein.

The electronic device herein can comprise, but is not limited to a mobile terminal such as a mobile phone, notebook computer, digital broadcast receiver, PDA (personal digital assistant), PAD (tablet computer), PMP (portable multimedia player), vehicle-mounted terminal (e.g., vehicle navigation terminal), wearable electronic device, etc., and a fixed terminal such as a digital TV, desktop computer, smart home device, etc.

It should be noted that the information processing apparatus 1900 shown in FIG. 19 is only an example, and should not bring any limitation to the function and the use range of the embodiment of the present disclosure.

As shown in FIG. 19, the information processing apparatus 1900 can comprise a processing apparatus (e.g., a central processing unit, a graphics processor, etc.) 1901, which can perform various appropriate actions and processes according to a program stored in a Read Only Memory (ROM) 1902 or a program loaded from a storage apparatus 1908 into a Random Access Memory (RAM) 1903. In the RAM 1903 are also stored various programs and data necessary for the operation of the information processing apparatus 1900. The processing apparatus 1901, ROM 1902, and RAM 1903 are connected to each other via a bus 1904. An input/output (I/O) interface 1905 is also connected to the bus 1904.

Generally, the following devices can be connected to the I/O interface 1905: an input apparatus 1906 comprising, for example, touch screen, touch pad, keyboard, mouse, camera, microphone, accelerometer, gyroscope, etc.; an output apparatus 1907 comprising, for example, Liquid Crystal Display (LCD), speaker, vibrator, etc.; a storage apparatus 1908 comprising, for example, a magnetic tape, hard disk, etc.; and a communication apparatus 1909. The communication apparatus 1909 can allow the information processing apparatus 1900 to perform wireless or wired communication with another device to exchange data. Although FIG. 19 shows a video push device 1900 having various apparatuses, it should be understood that all shown apparatuses are not required to be implemented or provided. More or fewer apparatuses can be alternatively implemented or provided.

An embodiment of the present disclosure further provides a computer program comprising: instructions which when executed by a processor, cause the processor to perform one or more steps of the information processing method in the above embodiments.

An embodiment of the present disclosure further provides a computer program product comprising instructions which when executed by a processor, cause the processor to perform one or more steps of the information processing method in the above embodiments.

An embodiment of the present disclosure further provides a computer-readable storage medium having thereon stored a computer program which when executed by a processor, causes the processor to implement one or more steps of the information processing method in the above embodiments.

Particularly, the process described above with reference to the flowchart can be implemented as a computer software program, according to the embodiment of the present disclosure. For example, the embodiment of the present disclosure comprise a computer program product comprising a computer program carried on a non-transitory computer-readable medium, the computer program containing program codes for performing the method illustrated by the flowchart. In such an embodiment, the computer program can be downloaded and installed from a network via the communication device 1909, or installed from the storage device 1908, or installed from the ROM 1902. When the computer program is executed by the processing apparatus 1901, the above functions defined in the information processing method of the embodiment of the present disclosure are executed.

It should be noted that the above computer-readable medium disclosed can be a computer-readable signal medium or a computer-readable storage medium or any combination of the two. The computer-readable storage medium can be, but is not limited to, for example, an electronic, magnetic, optical, electromagnetic, infrared, or semiconductor system, apparatus, or device, or any combination of the above. The computer-readable storage medium can comprise, but is not limited to: for a more specific example, an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium on which a program is contained or stored, and the program can be used by or in combination with an instruction execution system, apparatus, or device. Andin the present disclosure, the computer-readable signal medium can comprise a data signal propagated in baseband or as part of a carrier wave, on which the computer-readable program codes are carried. Such a propagated data signal can take a variety of forms comprising, but not limited to, an electro-magnetic signal, an optical signal, or any suitable combination of the above. The computer-readable signal medium can be any computer-readable medium except a computer-readable storage medium, which can send, propagate, or transmit the program used by or in combination with the instruction execution system, apparatus, or device. The program codes contained on the computer-readable medium can be transmitted by using any suitable medium which comprises but is not limited to: an electrical wire, an optical cable, RF (radio frequency), etc., or any suitable combination of the above.

In some embodiments, the client and the server can communicate by using any currently known network protocol or future developed network protocol, such as HTTP, and can be interconnected with digital data communication (e.g., a communication network) of any form or medium. Examples of the communication network comprise a local area network ("LAN"), a wide area network ("WAN"), an internet (e.g., the Internet), and a peer-to-peer network (e.g., an ad hoc peer-to-peer network), as well as any currently known or future developed network.

The above computer-readable medium can be comprised in the above information processing apparatus; and it can also exist alone without being assembled into the information processing apparatus.

On the above computer-readable medium are carried one or more programs which, when executed by the information processing apparatus, cause the information processing apparatus to execute:
displaying target information; when a sending operation of the user for the target information is detected, displaying the target control for triggering cancellation of sending the target information; and when the first triggering operation of the user for the target control is detected within a preset time duration, canceling sending the target information.

In an embodiment of the present disclosure, computer program codes for performing the operations of the present disclosure can be written in one or more programming languages or a combination thereof, the programming language comprising but not limited to an object-oriented programming language such as Java, Smalltalk, C++, as well as a conventional procedural programming language such as "C" language or a similar programming language. The program codes can be executed entirely on the user's computer, partly on the user's computer, as a stand-alone software package, partly on the user's computer and partly on a remote computer, or entirely on the remote computer or server. In a scenario where the remote computer is involved, the remote computer can be connected to the user's computer through any type of network, comprising a local area network (LAN) or a wide area network (WAN), or to an external computer (for example, connected over the Internet using an Internet service provider).

The flowcharts and block diagrams in the accompanying drawings illustrate the architecture, functions, and operations of possible implementations of the system, method and computer program product according to various embodiments of the present disclosure. In this regard, each block in the flowchart or block diagram can represent one module, program segment, or portion of the codes, which contains one or more executable instructions for implementing a specified logical function. It should also be noted that, in some alternative implementations, the functions given in the blocks can be generated in an different order given in the accompanying drawing. For example, two blocks shown in succession can, in fact, be executed substantially in parallel, or in a reverse order sometimes, which depends upon involved functions. It will also be noted that each block of the block diagram and/or flowchart, and a combination thereof, can be implemented by a special-purpose hardware-based system performing specified functions or operations, or by a combination of special-purpose hardware and computer instructions.

The units described in the embodiments of the present disclosure can be implemented by means of software or hardware. The name of the unit herein does not serve as a limitation on itself in some cases.

The above functions described herein can be at least partially performed by one or more hardware logic components. For example, without limitation, exemplary types of hardware logic components that can be used comprise: a field Programmable Gate Array (FPGA), an Application Specific Integrated Circuit (ASIC), an Application Specific Standard Products (ASSP), a system on a chip (SOC), a Complex Programmable Logic Device (CPLD), etc.

In the context of this disclosure, a machine-readable medium can be a tangible medium on which can be contained or stored a program used by or in combination with the instruction execution system, apparatus, or device. The machine-readable medium can be a machine-readable signal medium or a machine-readable storage medium. The machine-readable medium can comprise, but is not limited to, an electronic, magnetic, optical, electromagnetic, infrared, or semiconductor system, apparatus, or device, or any suitable combination of the above. The machine-readable storage medium comprises, for amore specific example, an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

The above description is only illustrative of the preferred embodiments of the present disclosure and the principles of the technology employed. It will be appreciated by those skilled in the art that the scope of the disclosure involved herein is not limited to a technical solution formed by a specific combination of the above technical features, and should also cover another technical solution formed by any combination of the above technical features or their equivalents without departing from the above disclosure concept. For example, it is a technical solution formed by interchanging the above features and the technical features disclosed in the present disclosure (but not limited to) having similar functions.

Furthermore, although operations are described in a specific order, this should not be understood as requiring that these operations be performed in the specific order shown or in a sequential order. Under certain circumstances, multitask and parallel processing may be advantageous. Similarly, although details of several specific implementations are comprised in the above discussion, they should not be construed as limitations on the scope of the present disclosure. Certain features described in the context of an individual embodiment can also be implemented in combination in a single embodiment. Conversely, various features described in the context of the single embodiment can also be implemented in a plurality of embodiments individually or in any suitable sub-combination.

Although this subject matter has been described in language specific to structural features and/or logical actions of methods, it should be understood that the subject matter defined in the attached claims is not necessarily limited to the specific features or actions described above. Rather, the specific features and actions described above are only exemplary forms of implementing the claims.

What is claimed is:

1. An information processing method comprising:
    displaying target information;
    when a sending operation of a user for the target information is detected, displaying a target control for triggering cancellation of sending the target information; and
    when a first triggering operation of the user for the target control is detected within a preset time duration, canceling sending the target information,
    wherein the detecting a sending operation of a user for the target information comprises:
        receiving a second triggering operation of the user for the target information;
        in response to the second triggering operation, superimposing at least one object icon on the target information, each object icon corresponding to one selectable object; and
        when a selection operation for a target object icon in the at least one object icon is detected, determining that the sending operation of the user for the target information is detected,
    wherein after the receiving a second triggering operation of the user for the target information, the information processing method further comprises superimposing a function list on the target information,
    wherein after the superimposing a function list on the target information, the information processing method further comprises:
        receiving a transparency adjustment operation of the user for the function list; and
        in response to the transparency adjustment operation, adjusting a transparency of the function list to a target transparency indicated by the transparency adjustment operation.

2. An information processing method comprising:
    displaying target information;
    when a sending operation of a user for the target information is detected, displaying a target control for triggering cancellation of sending the target information; and
    when a first triggering operation of the user for the target control is detected within a preset time duration, canceling sending the target information,
    wherein the detecting a sending operation of a user for the target information comprises:
        receiving a second triggering operation of the user for the target information;
        in response to the second triggering operation, superimposing at least one object icon on the target information, each object icon corresponding to one selectable object; and
        when a selection operation for a target object icon in the at least one object icon is detected, determining that the sending operation of the user for the target information is detected,
    wherein after the receiving a second triggering operation of the user for the target information, the information processing method further comprises superimposing a function list on the target information,
    wherein after the superimposing a function list on the target information, the information processing method further comprises:
        receiving a hiding operation of the user for the function list; and
        in response to the hiding operation, hiding the function list.

3. The information processing method according to claim 1, wherein after the superimposing at least one object icon on the target information, the information processing method further comprises:
    receiving a third triggering operation of the user; and
    in response to the third triggering operation, displaying other object icons than the at least one object icon.

4. The information processing method according to claim 1, further comprising:
    after sending the target information is cancelled, displaying first prompt information for indicating that sending the target information is cancelled.

5. The information processing method according to claim 1, further comprising:
    after the target information is sent, displaying second prompt information for indicating that the target information is sent.

6. The information processing method according to claim 1, wherein the selectable object comprises at least one of a user object or an application object.

7. The information processing method according to claim 1, wherein the target control comprises target prompt information for indicating that the target information is being sent to a target object corresponding to the target object icon.

8. An information processing apparatus comprising:
    a processor; and
    a memory configured to store executable instructions;
    wherein the processor is configured to read and execute the executable instructions from the memory to implement one or more steps of the information processing method according to claim 1.

9. A non-transitory computer-readable storage medium having thereon stored a computer program which, when executed by a processor, causes the processor to implement one or more steps of the information processing method according to claim 1.

10. A non-transitory computer program product comprising instructions which, when executed by a processor, cause the processor to perform one or more steps of the information processing method according to claim 1.

11. The information processing method according to claim 1, wherein when the sending operation of the user for the target information is detected, the information processing method further comprises:
   intercepting the target information;
   timing an interception duration of the target information; and
   detecting the first triggering operation of the user for the target control.

12. The information processing method according to claim 1, wherein the target control comprises:
   target prompt information, the first triggering operation comprising a triggering operation for the target prompt information; or
   target prompt information and a cancellation control, the first triggering operation comprising a triggering operation for the cancellation control; or
   a cancellation control, the first triggering operation comprising the triggering operation for the cancellation control,
   wherein the target prompt information is used for indicating that the target information is being sent.

13. The information processing method according to claim 1, further comprising:
   when the first triggering operation of the user for the target control is not detected within the preset time duration, sending the target information.

14. The information processing method according to claim 1, wherein after the determining that a sending operation of a user for the target information is detected and before the displaying a target control, the information processing method further comprises:
   hiding the object icon.

15. The information processing method according to claim 1, wherein in the case where the target information is a video, after the receiving a second triggering operation of the user for the target information, the information processing method further comprises:
   keeping a playing state of the video.

16. The information processing method according claim 1, wherein the superimposing at least one object icon on the target information comprises:
   sequentially superimposing the object icons of a plurality of selectable objects on the target information according to an object priority of each selectable object.

* * * * *